US010613870B2

(12) United States Patent
Frascati et al.

(10) Patent No.: US 10,613,870 B2
(45) Date of Patent: Apr. 7, 2020

(54) FULLY EXTENSIBLE CAMERA PROCESSING PIPELINE INTERFACE

(71) Applicant: QUALCOMM Incorporated, San Diego, CA (US)

(72) Inventors: Christopher Paul Frascati, San Diego, CA (US); Rajakumar Govindaram, San Diego, CA (US); Hitendra Mohan Gangani, San Diego, CA (US); Murat Balci, San Diego, CA (US); Lida Wang, San Diego, CA (US); Avinash Seetharamaiah, San Diego, CA (US); Mansoor Aftab, Sunnyvale, CA (US); Rajdeep Ganguly, San Diego, CA (US); Josiah Vivona, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 111 days.

(21) Appl. No.: 15/711,422

(22) Filed: Sep. 21, 2017

(65) Prior Publication Data
US 2019/0087198 A1    Mar. 21, 2019

(51) Int. Cl.
G06F 9/38     (2018.01)
G06T 1/60     (2006.01)
(Continued)

(52) U.S. Cl.
CPC .......... G06F 9/3867 (2013.01); G06F 9/3017 (2013.01); G06F 9/5061 (2013.01);
(Continued)

(58) Field of Classification Search
CPC ............. G06F 15/7878; G06F 9/30079; G06F 9/38–3897; G06F 9/5061–5088; G06F 13/1615; G06T 1/20; G06T 1/60
See application file for complete search history.

(56) References Cited

U.S. PATENT DOCUMENTS 9,569,221 B1 *   2/2017  Chaudhri ............... G06F 9/3851
2014/0016004 A1 * 1/2014  Talvala ................... H04N 5/232
                                                         348/241
(Continued)

FOREIGN PATENT DOCUMENTS

WO      2016149894 A1    9/2016

OTHER PUBLICATIONS

International Search Report and Written Opinion—PCT/US2018/051772—ISA/EPO—dated Nov. 26, 2018, 18 pp.

Primary Examiner — Paul M Berardesca
(74) Attorney, Agent, or Firm — Shumaker & Sieffert, P.A.

(57) ABSTRACT

A method for camera processing using a camera application programming interface (API) is described. A processor executing the camera API may be configured to receive instructions that specify a use case for a camera pipeline, the use case defining at least one or more processing engines of a plurality of processing engines for processing image data with the camera pipeline, wherein the plurality of processing engines includes one or more of fixed-function image signal processing nodes internal to a camera processor and one or more processing engines external to the camera processor. The processor may be further configured to route image data to the one or more processing engines specified by the instructions, and return the results of processing the image data with the one or more processing engines to the application.

30 Claims, 21 Drawing Sheets

(51) Int. Cl.
*G06F 9/30* (2018.01)
*G06T 1/20* (2006.01)
*G06F 9/50* (2006.01)
*H04N 5/232* (2006.01)
*H04N 5/235* (2006.01)
*H04N 9/79* (2006.01)
*H04N 21/443* (2011.01)

(52) U.S. Cl.
CPC .................. *G06T 1/20* (2013.01); *G06T 1/60* (2013.01); *H04N 5/23229* (2013.01); *H04N 9/79* (2013.01); *H04N 21/4431* (2013.01); *G06T 2200/28* (2013.01); *H04N 5/235* (2013.01); *H04N 5/2357* (2013.01); *H04N 5/23212* (2013.01)

(56) References Cited

U.S. PATENT DOCUMENTS

2014/0055347 A1* 2/2014 Taylor .................. G06F 9/5044
 345/156
2016/0210721 A1 7/2016 Taylor et al.

\* cited by examiner

FULLY EXTENSIBLE CAMERA PROCESSING PIPELINE INTERFACE

TECHNICAL FIELD

This disclosure generally relates to image and video processing, and more particularly, to techniques for controlling the operation of a camera processor and/or camera module.

BACKGROUND

Image capture devices (e.g., digital cameras) are commonly incorporated into a wide variety of devices. An image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets such as mobile telephones, cellular or satellite radio telephones, tablet computers, laptop computers camera-equipped personal digital assistants (PDAs), computer devices that include cameras such as so-called "web-cams," or any devices with digital imaging or video capabilities.

Image capture devices may include a camera module, including an image sensor, as well as a camera processor. A camera processor may be configured to control the operation of the camera module, as well as perform image processing on any image data or video data captured by the camera module. As image capture devices are often part of a larger computing system, any image data captured and processed by the camera module and camera processor may be available for processing and/or display by other processing modules of the computing system.

SUMMARY

In general, this disclosure describes techniques for controlling the operation of a camera processor and/or a camera module. This disclosure describes a combined camera application programming interface (API) and driver that may be used to flexibly select one or more processing engines, from a plurality of processing engines, that may be used to process image data captured by a camera module. Example processing engines may include one or more processing engines that are part of an image signal processing (ISP) pipeline of a camera processor. Additionally, the processing engines may include processing engines that are external to the camera processor, including a digital signal processor (DSP) and a graphics processing unit (GPU).

The API described in this disclosure is not limited to selecting which processing engines to use on captured image data, but may also flexibly select how the image data is routed through the selected processing engines. In this way, an application developer may build custom processing pipelines using a plurality of processing engines available on the device including the camera sensor, without needing to write code directed to the specifics of each processing engine.

In one example of the disclosure, a method for camera processing comprises receiving instructions from an application that specify a use case for a camera pipeline, the use case defining one or more processing engines of a plurality of processing engines for processing image data with the camera pipeline, wherein the plurality of processing engines includes one or more of fixed-function image signal processing nodes internal to a camera processor and one or more processing engines external to the camera processor, routing image data to the one or more processing engines specified by the instructions, and returning the results of processing the image data with the one or more processing engines to the application.

In another example of the disclosure, an apparatus configured for camera processing comprises a memory configured to store an application and a camera application programming interface (API), and a processor in communication with the memory and configured to execute the camera API to receive instructions from the application that specify a use case for a camera pipeline, the use case defining one or more processing engines of a plurality of processing engines for processing image data with the camera pipeline, wherein the plurality of processing engines includes one or more of fixed-function image signal processing nodes internal to a camera processor and one or more processing engines external to the camera processor, route image data to the one or more processing engines specified by the instructions, and return the results of processing the image data with the one or more processing engines to the application.

In another example, this disclosure describes a computer-readable storage medium storing instructions that, when executed, cause one or more processors to receive instructions from an application that specify a use case for a camera pipeline, the use case defining one or more processing engines of a plurality of processing engines for processing image data with the camera pipeline, wherein the plurality of processing engines includes one or more of fixed-function image signal processing nodes internal to a camera processor and one or more processing engines external to the camera processor, route image data to the one or more processing engines specified by the instructions, and return the results of processing the image data with the one or more processing engines to the application.

In another example of the disclosure, an apparatus configured for camera processing comprises means for receiving instructions from an application that specify a use case for a camera pipeline, the use case defining one or more processing engines of a plurality of processing engines for processing image data with the camera pipeline, wherein the plurality of processing engines includes one or more of fixed-function image signal processing nodes internal to a camera processor and one or more processing engines external to the camera processor, means for routing image data to the one or more processing engines specified by the instructions, and means for returning the results of processing the image data with the one or more processing engines to the application.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
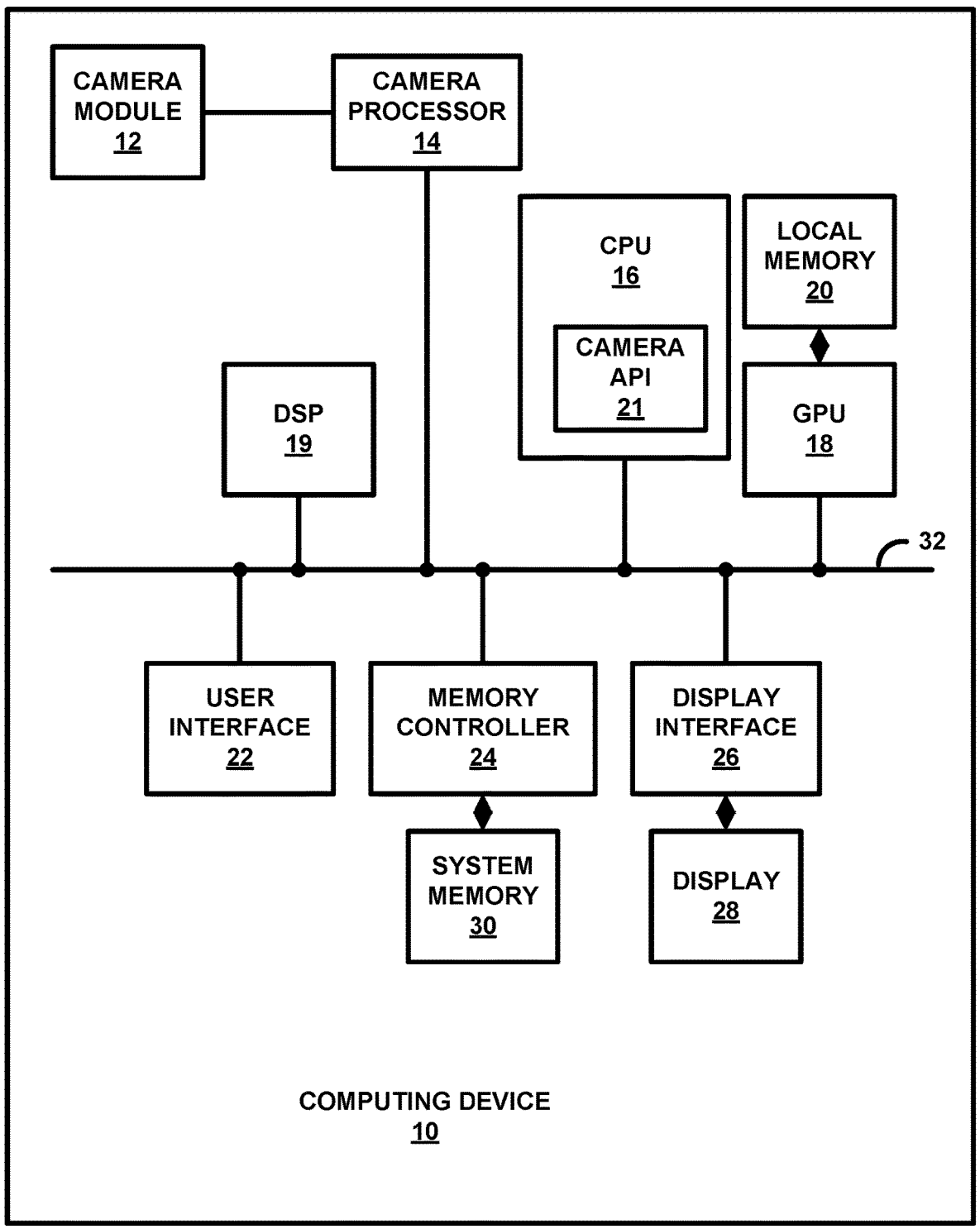
FIG. 1 is block diagram of an exemplary device that may implement the camera API of this disclosure.

Image data captured by a camera module may be processed by a camera pipeline. In general, a camera pipeline may include processing stages on the camera module (e.g., including the image sensor itself), as well as processing stages on a camera processor executing an image signal processing (ISP) pipeline. A camera processor may perform so-called "open-loop" processing on image data captured by the image sensor to control certain characteristics of how the camera module and/or image sensor functions. Examples of such open-loop processing may include an autofocus process (e.g., to determine a focus point and lens position), an auto exposure control process (e.g., to determine a shutter speed and aperture size), and an auto white balance process (e.g., to determine an illuminant). A camera processor may further perform so-called "closed-loop" processing on image data captured by the image sensor. The closed-loop processing typically alters the image data itself before storage into memory. Example closed-loop processing may include demosaicing, color correction, effects, denoising, filtering, compression, and the like.

A computing device may perform image processing taking advantage of any number of processing engines available on a device that includes a camera sensor, including processing engines for other image processing techniques performed on the camera processor. In addition, image processing may also be performed on processing engines external to a camera processor, including a digital signal processor (DSP), a graphics processing unit (GPU), a central processing unit (CPU), a display processor, and the like.

Unlike GPU application programming interfaces (APIs) or audio APIs, there is no standard for controlling all aspects of the operation of the camera pipeline, especially when considering all possible processing engines available to perform image processing. Existing camera interfaces typically have several limitations which prevent developers from using the camera interface as a generic image processing interface. Without a clean, coordinated way to manage the flow off data across possible image processing engines (e.g., data flow across both the processing engines and sensor blocks), it is difficult to take advantage of all of the processing power that that may be available in a low-latency, easy-to-program manner.

The techniques of this disclosure address the limitations of existing camera interfaces by providing access to individual fixed-function and/or programmable processing engines within the camera processor, as well as processing engines external to the camera processor. In other examples, the API of this disclosure provides an interface for explicitly requesting a particular processing flow (e.g., data path through various processing engines) for a given use case.

This disclosure describes a camera API that may be used to select processing engines and define data flows for custom image processing pipelines. The available processing engines may include both processing engines that are internal to a camera processor and processing engines that are external to the camera processor (e.g., a GPU, DSP, CPU, etc.).

In one example, the API of this disclosure may be configured as a standalone API, with the ability to consume image data from either an image sensor or from memory. In other examples, to maintain backward-compatibility with the existing camera interfaces, the API of this disclosure may be configured to override specific functionality of older camera interfaces. For example, the API and driver of this disclosure may operate as extension of existing camera interfaces, such as Google's HAL3 interface. That is, the API of this application may be configured to receive and interpret commands from other existing camera interfaces. In such an example, the API and driver of this disclosure extends the functionality of existing interfaces in such a way to allow for low-latency, straightforward programming of a camera processing pipeline across any number of different processing engines.

FIG. 1 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (e.g., a mobile telephone, a cellular telephone, a satellite telephone, and/or a mobile telephone handset), an Internet telephone, a digital camera, a digital video recorder, a handheld device such as a portable video game device or a personal digital assistant (PDA) or any device that may include a camera.

As illustrated in the example of FIG. 1, computing device 10 includes a camera module 12, that includes an image sensor, a camera processor 14, a central processing unit (CPU) 16, a graphical processing unit (GPU) 18, local memory 20 of GPU 18, a digital signal processor (DSP) 19, user interface 22, memory controller 24 that provides access to system memory 30, and display interface 26 that outputs signals that cause graphical data to be displayed on display 28. Camera module 12 may be configured to include one or more image sensors (e.g., dual camera devices).

Although the various components are illustrated as separate components, in some examples the components may be combined to form a system on chip (SoC). As an example, camera processor 14, CPU 16, GPU 18, DSP 19, and display interface 26 may be formed on a common integrated circuit (IC) chip. In some examples, one or more of camera processor 14, CPU 16, GPU 18, DSP 19, and display interface 26 may be in separate IC chips. Various other permutations and combinations are possible, and the techniques should not be considered limited to the example illustrated in FIG. 1.

The various components illustrated in FIG. 1 (whether formed on one device or different devices), may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

GPU 18 may be configured to perform graphics operations to render one or more graphics primitives to display device 8. Thus, when software applications executing on CPU 16 requires graphics processing, CPU 16 may provide graphics rendering commands along with graphics data to GPU 18 for rendering to display device 28. The graphics data may include, e.g., drawing commands, state information, primitive information, texture information, etc. GPU 18 may, in some instances, be built with a highly-parallel structure that provides more efficient processing of complex graphic-related operations than CPU 16. For example, GPU 18 may include a plurality of processing elements, such as shader units, that are configured to operate on multiple vertices or pixels in a parallel manner. The highly parallel nature of GPU 18 may, in some instances, allow GPU 18 to draw graphics images (e.g., GUIs and two-dimensional (2D) and/or three-dimensional (3D) graphics scenes) onto display device 28 more quickly than drawing the scenes directly to display device 28 using CPU 16.

In other examples, in addition to graphics rendering, GPU 18 may be configured to perform various image processing techniques. The shader units of GPU 18 may be configured, with instructions received from CPU 16, to perform a wide variety image processing techniques, including rotation, skew correction, cropping, image sharpening, scaling, and the like.

GPU 18 may include a local memory 20 for more quickly accessing image data for processing. In some examples, local memory 20 may be part of GPU 18. For example, local memory 20 may be on-chip memory or memory that is physically integrated into the integrated circuit chip of GPU 18. If local memory 20 is on-chip, GPU 18 may be able to read values from or write values to local memory 20 more quickly than reading values from or writing values to system memory 30 via bus 32.

DSP 19 may be configured as a microprocessor that is optimized for digital signal processing. DSP 19 may be configured for measuring, filtering, and/or compressing digital signals (e.g., pixel values of image data). In some examples, the microprocessor of DSP 19 may be configured to perform a large number of mathematical functions repeatedly on a series of data samples. In the context of this disclosure, DSP 19 may be configured to perform image processing applications on pixel values of image data captured by camera module 12.

Camera processor 14 is configured to receive image data (e.g., frames of pixel data) from camera module 12, and process the image data to generate output image content. CPU 16, GPU 18, DSP 19, camera processors 14, or some other circuitry may be configured to process the image data captured by camera module 12 into images for display on display 28. In the context of this disclosure, the image data may be frames of data for a still image, or frames of video data. The image data may be received by camera processor 14 in any format, including different color formats, including RGB, YCbCr, YUV, and the like.

In some examples, camera processor 14 may be configured as an image signal processor. For instance, camera processor 14 may include a camera interface (e.g., called an image front end (IFE)) that interfaces between camera module 12 and camera processor 14. Camera processor 14 may include additional circuitry to process the image content. For example, camera processor 14 may include one or more image processing engines (IPEs) configured to perform various image processing techniques, including demosaicing, color correction, effects, denoising, filtering, compression, and the like.

In addition, camera processor 14 may include one or more processing engines to perform so-called statistics algorithms. Statistics algorithms may include image processing techniques that analyze image data captured may camera module 12 in order to adjust how camera module 12 captures an image. Examples of processing techniques performed by the statistics algorithms may include auto focus, auto exposure control, auto white balance, auto scene detection, and the like.

Camera processor 14 may be configured to output the resulting images (e.g., pixel values for each of the image pixels) to system memory 30 via memory controller 24. Each of the images may be further processed for generating a final image for display. For example, GPU 18 or some other processing unit, including camera processor 14 itself, may perform color correction, white balance, blending, compositing, rotation, or other operations to generate the final image content for display.

Camera module 12 may include processing circuitry, an image sensor including an array of pixel sensors (e.g., pixels) for capturing light, a memory, an adjustable lens, and an actuator to adjust the lens. Camera module 12 may include any type of image sensor, including a phase detection auto focus (PDAF) sensor. In some examples, camera module 12 may include multiple cameras, such as in a dual camera system. In a dual camera system, camera module may include two image sensors, each with their own individually controllable lenses and actuators.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, an operating system, a word processor application, a web browser application, an email application, a graphics editing application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of a software application is a camera application. CPU 16 executes the camera application, and in response, the camera application causes camera processor 14 and camera module 12 to generate content for display on display 28. For example, display 28 may output information such as light intensity, whether flash is enabled, and other such information. The user of computing device 10 may interface with display 28 to configure the manner in which the images are generated (e.g., with or without flash, focus settings, exposure settings, and other parameters). The camera application also causes CPU 16 to instruct camera processor 14 to process the images captured by camera module 12 in the user-defined manner. The camera application may further cause display 28 to display images captured by camera module 12 and camera processor 14.

According to the techniques of this disclosure, CPU 16 may further be configured to execute camera API 21. Camera API 21 may be configured to receive instructions from a camera application executing on CPU 16 and/or from an existing camera interface (e.g., HAL3). Camera API 21 may receive and process the instructions from the camera application to cause camera module 12 to capture image. Camera API 21 may further cause one or more processing engines internal to camera processor 14, and/or one or more processing engines external to camera processor 14 (e.g., DSP 19, GPU 18) to perform image processing techniques on the captured images. The results of the image processing directed by camera API 21 may then be returned to the camera application for display and/or storage.

In one example of the disclosure, CPU 16, through execution of camera API 21 may be configured to receive instructions, from a camera application, that specify a use case for a camera pipeline. The use case defines one or more processing engines of a plurality of processing engines for processing image data with the camera pipeline, wherein the plurality of processing engines includes one or more of fixed-function image signal processing nodes internal to camera processor 14 and one or more processing engines external to the camera processor 14 (e.g., those of GPU 18 or DSP 19 as two examples). CPU 16 may further be configured to route image data to the one or more processing engines specified by the instructions, and return the results of processing the image data with the one or more processing engines to the camera application. Details of the features of camera API 21 will be described in more detail with references to FIGS. 2-15 of the application.

Camera processor 14, CPU 16, and GPU 18 may store image data, and the like, in respective buffers that are allocated within each of camera processor 14, CPU 16, and GPU 18, or within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Figure 2:
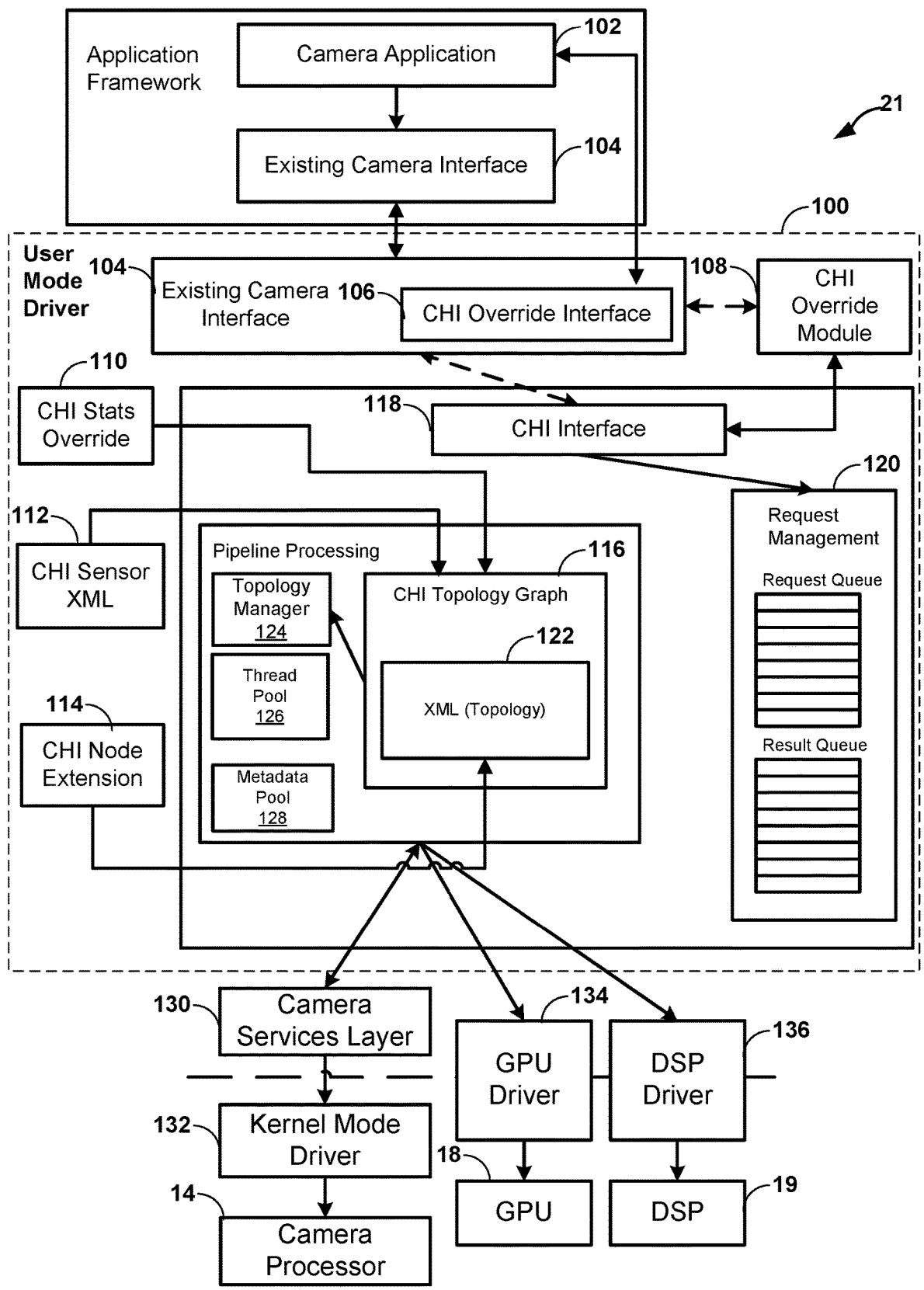
FIG. 2 illustrates an example camera API of this disclosure.

FIG. 2 illustrates camera API 21 and other connected software and hardware components of computing device 10. The following terms may be used when describing the functionality and features of this disclosure. A "use case" is a specific configuration of a camera pipeline (e.g., including processing engines internal to camera processor 14, processing engines external to camera processor 14, and buffers used to store inputs and output image data) which achieves a defined functionality. An example use case may be a 20 megapixel (MP) snapshot with zero shutter lag (ZSL) and a preview on a 2k display. As will be explained in more detail below, camera API 21 is configured to receive instructions that specify any conceivable user-defined use case, within the limits of the underlying hardware, and without driver modification of the specific hardware used, and route image data through the processing engines and buffers specified by the use case.

A "session" is a period of time from when a camera pipeline has been configured, and is ready to process images, until the camera pipeline is destroyed (e.g., no longer desired), and another pipeline may be configured in its place. Camera API 21 may be configured to support multiple parallel sessions.

A "request" is an action to have the camera pipeline process data. A request can be a request to process a frame of image data captured directly from an image sensor of camera module 12, or to process a frame of image data from memory. A result stemming from the request is returned from camera API 21 to camera application 102.

A "sub-request" is an action to break a single request into multiple internal requests. The results of sub-requests are not returned outside of camera API 21. Instead, the results of sub-requests are combined into a single result, which corresponds to the original request. Sub-requests are used to enable certain camera features, such as high dynamic range (HDR) image capture, where multiple exposure changes to the image sensor are used to generate a single image, or to enable multi-frame post-processing, where multiple images are merged to create a single output image.

A "stream" is a sequence of buffers with identical or similar sizes and formats which are used for processing image data. Multiple streams of different types can be specified as input and output to the various processing engines specified for the camera pipeline. This set of streams is one component of defining a use case.

"Per-session settings" are settings which affect the camera processing pipeline. Per-session settings cannot be changed once a session begins. Example per-session setting may include settings for image stabilization processing. "Per-request settings" are settings which affect individual requests within a session. Example per-request setting may include manual exposure values (e.g., aperture size and shutter speed).

A "topology" is a directed acyclic graph (DAG) which represents a single use case. The DAG is made up of a series of processing nodes, and a set of links which describe the buffers being processed by those processing nodes. In one example, topologies may be specified via an extensible markup language (XML) file. In general, the contents of an XML file describe the transportation, structure, and/or storage of data. In the context of this application, the XML file describing the DAG may indicate the processing engines used, the structure of the data to be processed, the flow of data between processing engines, and the buffers used as both input and output buffers for each of the specified processing engines.

A "node" is a logical block of functionality within the camera pipeline, which executes on a single processing engine. Nodes are linked together to form a topology. In some examples, nodes that external to camera processor 14 (e.g., GPU 18, DSP 19, CPU 16) may be invoked via CPU which invokes the native API for the specific processing engine. Example native APIs may include OpenCL, OpenGL, DirectX, FastCV, and others.

A processing "engine" is hardware that can be used to process data. Example hardware may include fixed-function or programmable processing engines in camera processor 14, GPU 18, CPU 16, DSP 19, or any other processing circuitry available on computing device 10.

A "pipeline" is a unique context to enable data manipulation. Each pipeline can maintain its own state across multiple requests, without other pipelines affecting it. A pipeline utilizes a topology to define the engines used, and the flow of data processing.

"Statistics" algorithms are algorithms including the so-called "3A algorithms" which are used to automatically control the image sensor and camera processor 14 in order to achieve better image quality. The 3A algorithms may include autofocus (AF), auto exposure control (AEC), and auto white balance (AWB).

A "live stream" refers to any configuration in which the processing engines receive data from an image sensor, and cannot modify any data from previous request (e.g., data previously stored in memory). Processing which does not fit within the sensor data rate can be moved into an offline stream (e.g., a stream which processes data stored in a memory).

An "offline stream" is any configuration in which the processing engines do not receive data from an image sensor. Camera API 21 allows for offline streams to be paired with live streams without additional latency. The results of an offline stream can be returned to camera application 102.

CPU 16 may be configured to execute instructions according to an application framework in order to control the operation of camera processor 14 and camera module 12 and/or process image data captured by camera module 12. In the context of this disclosure, image data may be either still image data or frames of video data. The application framework may include both a camera application 102 as well as an existing camera interface 104, such as Google's HAL3 interface. Camera application 102 is an application configured to instruct CPU 16 to cause camera module 12 to capture image data. Camera application 102 may also be configured to instruct CPU 16 to perform one or more processing techniques on captured image data, whether sourced directly from camera module 12 or from a memory.

In some examples, camera application 102 may be configured with commands that are specifically designed to communicate with camera API 21. That is, camera API 21 may be configured as a standalone API. In other examples, camera API 21 is not only configured to function as a standalone API, but is also configured to build upon exiting camera interface 104, such as Google's HAL3 camera interface. HAL3 is designed around explicit per-request control of the camera pipeline. While the HAL3 interface is flexible enough to allow a variety of use cases, it does not allow end-users to take full advantage of all of the hardware and software paths available in a typical computing device 10. Camera API 21 extends existing camera interface 104 in such a way that an end-user is able to modify and accelerate any part of a camera pipeline, both internal and external to camera processor 14, with minimal unnecessary latency.

Camera API 21 of FIG. 2 includes five components which, individually and collectively, allow for developers to take full advantage of the processing engines available on computing device 10. The five components include camera hardware interface (CHI) override module 108, CHI stats module 110, CHI Sensor XML module 112, CHI Node Extension module 114, and CHI Topology Graph module 116.

In examples where camera application 102 only includes commands directed toward existing camera interface 104, the user mode driver 100 of camera API 21 may be configured process such commands using existing camera interface 104. In this case, CHI Override Interface module 106 will not be triggered, and commands for existing camera interface 104 will be passed to CHI interface 118 for processing as normal.

In examples where camera application 102 includes commands directed toward API 21, the user mode driver 100 of camera API 21 may be configured to process such commands through CHI override interface 106 and CHI override module 108.

CHI override module 108 supplements existing camera interface 104 to allow for explicit image processing pipeline generation, explicit processing engine selection, and multi-frame control for any camera application that is compliant with existing camera interface 104. CHI override module 108 overrides the direct application of existing camera interface 104 and instead allows for the explicit selection and definition of camera pipeline topologies for custom use cases.

CHI interface 118 receives and processes requests from either existing camera interface 104 (e.g., for camera application instructions that only use existing camera interfaces) or from CHI override module 108 (e.g., for camera applications instructions that are directed to the functionality of camera API 21). Request management module 120 is configured to batch requests in a request queue, regardless of their source. Request management module 120 may further include a results queue for storing the results (e.g., memory location of process image data) related to each of the requests. The results of the request may be returned to camera application 102.

CHI topology graph module 116 allows for an arbitrary camera pipeline to be constructed to process image data. The camera pipeline may include one or more processing engines from a plurality of processing engines. Possible processing engines may include programmable and/or fixed function processing blocks internal to camera processor 14, and extended processing engines, which are completely controlled outside of a typical camera driver stack (e.g., DSP 19 and GPU 18). The topology of the camera pipeline may be specified by a DAG described in XML file 122. As will be described in more detail below, CHI topology graph 116 may receive instructions from camera application 102 that include pointers to topologies specified in XML file 122 that describe the camera pipeline for a particular use case. XML file 122 may specify, among other things, one or more processing engines to use in the camera pipeline, data links between the processing engines, a sequence of buffers which are used as inputs and outputs for the one or more processing engines, and/or a session length of the camera pipeline.

In some examples, XML file 122 may be a single XML file with a collection of topologies for different camera use cases. XML file 122 may be loaded when a process engaging camera API 21 is initialized. XML file 122 may be configured as a key plus data store, where a key is used to choose a specific topology from the available set of topologies. The data in XML file 122 may be configured as a DAG (topology) and the key may include per-session settings plus a collection of streams. XML file 122 may include default topologies for common use cases. In addition, XML file 122 may be configured to be edited and/or added to. Developers may edit XML file 122 to define and create custom topologies. In this way, camera API 21 provides an interface to explicitly specify and select a custom topology using any processing engine available on computing device 10.

Topology manager 124 may be configured to setup the topologies and streams specified by XML file 122. Thread pool 126 is a centralized thread pool that may be configured to control execution of all work requested for the camera pipeline specified in XML file 122. Metadata pool 128 is a per-request data aggregator that provides a centralized location for managing state transactions between nodes.

CHI node extension module 114 is a further extension of camera API 21. CHI node extension module 114 provide hooks (e.g., command translations to hardware specific APIs) to streamline additional processing on CPU 16, GPU 18 (e.g., via OpenCL, OpenGL ES, or Vulkan), and/or DSP 19 (e.g., via OpenDSP, FastCV™ software development kit, or custom programming). Custom processing nodes can specify the processing engine(s) external to camera processor 14 (e.g. through private vendor tags) to be used by the application, and interact with processing engines internal to camera processor 14 and/or other extended nodes.

In some examples, CHI node extension module 114 may be configured as a C function pointer table-based interface. Each node implementation may be compiled into a single ".so" file, which exports a single entry point function that is used to set up the interface. CHI node extension module 114 may be configured to implement a table of callback function pointers, which camera API 21 uses to call into the node. CHI node extension module 114 may be configured to generate metadata vendor tags for custom nodes (e.g., processing engines external to camera processor 14) to enable a custom node to communicate with CHI default nodes (e.g., processing engines internal to camera processor 14) or other custom external nodes.

CHI stats override module 110 provides mechanisms to override any default stats algorithms performed by camera processor 14 without the need for driver changes. Example stats algorithms will be discussed in more detail below, but may include AF, AEC, AWB, and other processing techniques that are used to control how camera module 12 captures image data in order to achieve better image quality. Custom stats algorithms may be configured to store data, which is also accessible by custom nodes specified by XML file 122.

CHI sensor XML module 112 is configured to allow device manufactures to define parameter-driven drivers for specific hardware components including image sensor(s), actuators, electronically erasable programmable read-only memory (EEPROM), flash components of camera module 12.

Camera services layer 130 provides an interface between user mode driver 100 of camera API 21 and kernel mode driver 132. Camera services layer 130 may be configured to provide session management, device operations, buffer allocations, packet submission, real-time topology, fence objects, hardware activation (e.g., processing engine on/off), and kernel mode to driver mode messaging (e.g., errors and timestamps). Camera services layer 130 may be configured to manage each session defined by a particular use case. Session management may include maintaining a context for a camera operation. Camera services layer 130 may be configured to support multiple concurrent sessions.

Camera services layer 130 may also be configured to detect the hardware available to camera application 102 and camera API 21. Camera services layer 130 may be configured to discover available hardware associated with camera processor 14 and camera module 12. As will be explained in more detail below, camera processor 14 may include various programmable and fixed-function processing engines, including an image front end (IFE), an image processing engine (IPE), and a statistics algorithm engine configured to perform 3A and other processing. In addition, camera services layer 130 may be configured to query computing device 10 to determine any platform specific capabilities. Platform specific capabilities may include the availability of GPU 18, DSP 19, and other available processing engines. Camera services layer 130 may be configured to reserve any detected processing engines available on computing device 10 and reserve any specific resources (e.g., memory resources) associated with the processing engine. Camera services layer 130 may further be configured allocate buffers for user mode driver 100. Camera services layer 130 may be configured to map the buffers to a particular camera hardware context and manage any associate caches.

Camera services layer 130 may further be configured to manage packet submission. Camera services layer 130 may be configured to submit packets for a request to individual processing engines. In this context, a packet contains configuration command and buffer IO information for the processing engines, including processing engines internal and external to camera processor 14.

Camera services layer 130 may further be configured to link processing engines specified by the instructions received by camera API 21 (e.g., an XML file containing the DAG). The topology linked by camera services layer 130 allows for per-frame application of packets for a request.

Camera services layer 130 may be further configured to manage fence objects. In this context, a fence object may be a buffer that is used as both input and output for the various processing engines specified by the topology. Camera services layer 130 may provide for shared signaling between user mode driver 100 and kernel mode driver 102 to provide for efficient handoff of buffers between processing engines. For example, camera service layer 130 may configured to handoff a buffer used as an output buffer for one processing engine to another processing engine that will use the context of the buffer as an input.

Kernel mode driver 132 may be configured to direct the programming of processing engines internal to camera processor 14, including memory management, fence management, and power management. Kernel mode driver 132 may also include a request manager that aggregates hardware programming packets and routes to appropriate processing engines specified by XML file 122. Kernel mode driver 132 may also be configured to manage timing sensitive programming.

Camera API 21, using CHI node extension 114, may issue commands that invoke graphics driver 134 to control the operation of GPU 18 when GPU 18 is specified as a custom node in XML file 122. Graphics driver 134 may operate according to a graphics API. Similarly, camera API 21, using CHI node extension 114, may issue commands that invoke DSP driver 136 to control the operation of DSP 19 when DSP 19 is specified as a custom node in XML file 122. DSP driver 136 may operate according to a DSP API.

Figure 3:
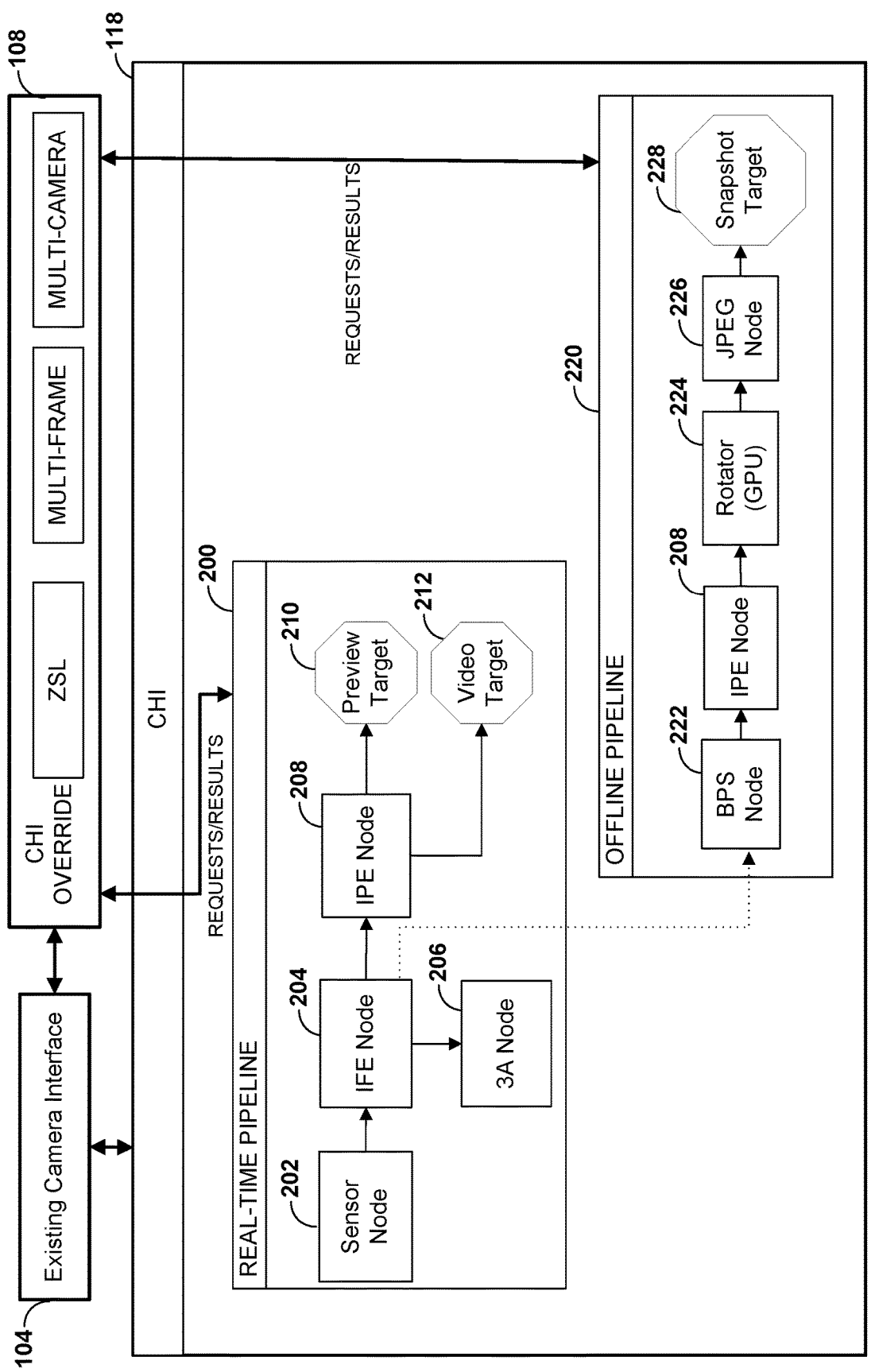
FIG. 3 is a conceptual diagram illustrating an example real-time pipeline and offline pipeline.

FIG. 3 is a conceptual diagram illustrating an example real-time pipeline and offline pipeline. Real-time pipeline 200 may be a type of live stream. As described above, a live stream refers to any configuration in which the processing engines receive data from an image sensor, and cannot modify any data from previous request (e.g., data previously stored in memory). Offline pipeline 220 may be a type of offline stream. An offline stream is any configuration in which the processing engines do not receive data from an image sensor, but rather access image data from a memory or from another processing engine.

Existing camera interface 104 may receive instructions from camera application 102 that include instructions for defining a custom pipeline, as described above. Such instructions may trigger CHI override module 108 to cause camera API 21 to build one or more camera pipelines based on the topologies specified in XML file 122. In this example of FIG. 3, the pipelines include real-time pipeline 200 and offline pipeline 220. Possible types of custom pipelines may include pipelines for zero shutter lag (ZSL), multi-frame, and/or multi-camera uses cases. Of course, the techniques of this disclosure are applicable for use with any use case.

FIG. 3 depicts the series of nodes defined for real-time pipeline 200 for a preview use case. A preview use case may be a use case whereby image data captured by camera module 12 is processed and displayed on display 28 in real-time. Sensor node 202 represents the logical functionality of the image sensor of camera module 12. IFE node 204 represents the functionality of a front-end image processing engine of camera processor 14. IFE node 204 represents an IFE processing engine that is configured to consumes data (e.g., MIPI data) from an image sensor and is configured to perform various operations on the data in real-time (e.g., convert MIPIP data to other formats, such as Bayer, YUV, etc.). Processing on IFE node 204 may be configured to occur at the rate that the image sensor operates at.

3A node 206 represents the functionality of a statistics algorithm processing engine of camera processor 14. 3A node 206 may be configured to perform one or more of AF, AEC, and/or AWB processing to control the function of camera module 12. IPE node 208 represents an image processing engine internal to camera processor 14. IPE node 208 may be configured to handle various offline image processing techniques (e.g., image processing that does not need to occur at the same speed as the image sensor). In some examples, IPE node 208 may be configured to perform processing techniques for video and preview use cases. Preview target 210 and video target 212 represent memories (e.g., frame buffers of system memory 30) used for displaying image data for camera and camcorder (video) application.

Offline pipeline 220 is configured to process image data, after processing by IFE node 204, for a snapshot use case and eventual storage. In this way, offline pipeline 220 may be considered a post-processing pipeline. Unlike real-time pipeline 200, offline pipeline 220 does not access image data directly from camera module 12 (e.g., sensor node 202), but rather accesses data from IFE node 204, either directly or through an output buffer of IFE node 204. Offline pipeline 220 may include Bayer processing segment (BPS) node 222 (e.g., for snapshots), IPE node 208, rotator node 224, and JPEG node 226. As shown in FIG. 3, rotator node 224 may be performed by a processing engine external to camera processor 14. In this case, GPU 18. Rotator node 224 may be configured to rotate the image being processed by some angle. JPEG node 226 may be configured to apply a compression algorithm (e.g., JPEG) to the image data. Snapshot target 228 may represent the memory to which the processed image data is to be stored.

Figure 4:
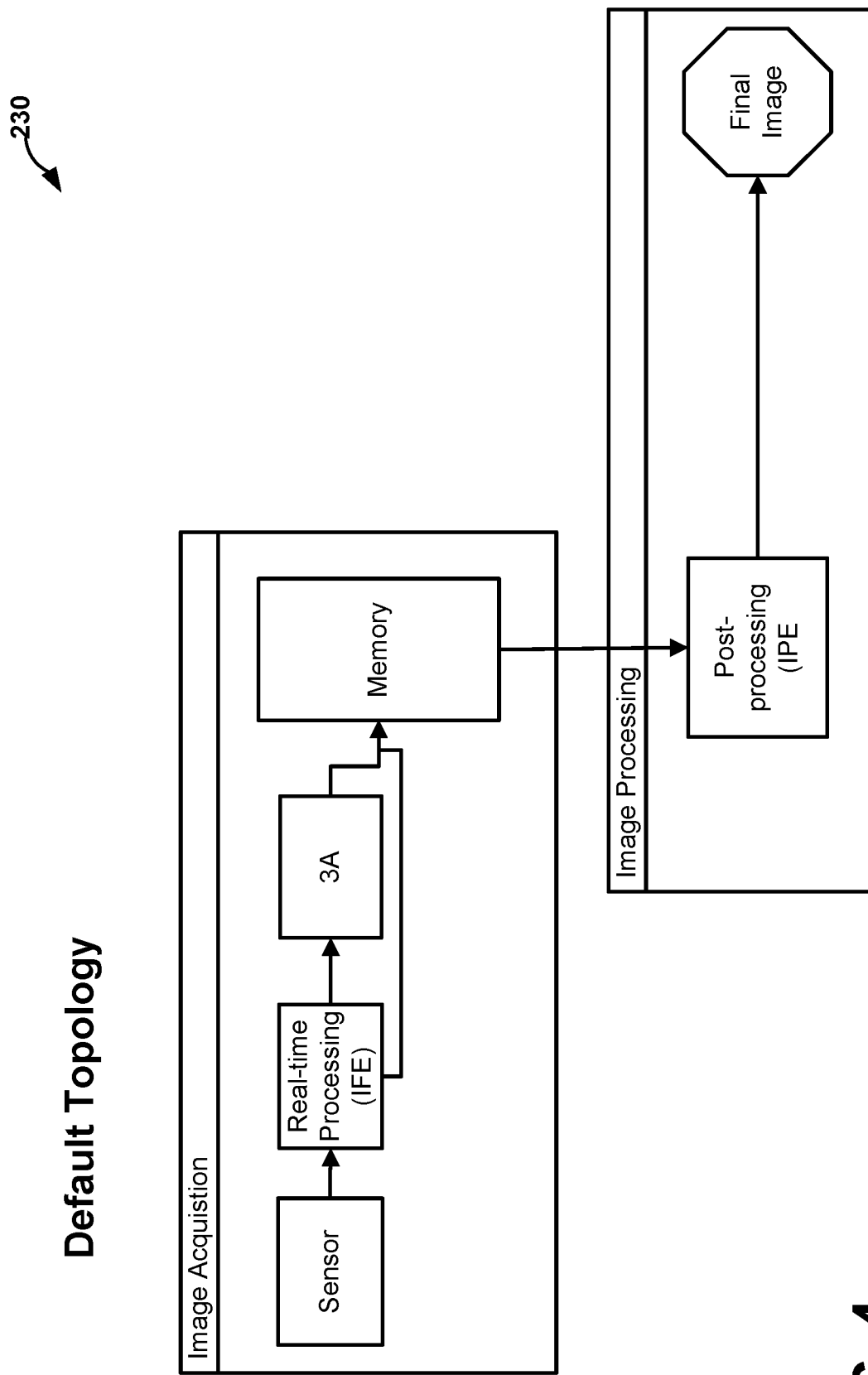
FIG. 4 is a conceptual diagram illustrating an example default topology.

As explained above with reference to FIG. 2, XML file 122 may include a set of default topologies that represent common camera use cases. FIG. 4 is a conceptual diagram illustrating an example default topology. Default topology 230 may represent a snapshot use case that includes an image acquisition stage, that may use IFE and statistics algorithm (3A) processing engines of camera processor 14.

Default topology 230 may further include in image processing stage that uses an IPE processing engine of camera processor 14.

Figure 5:
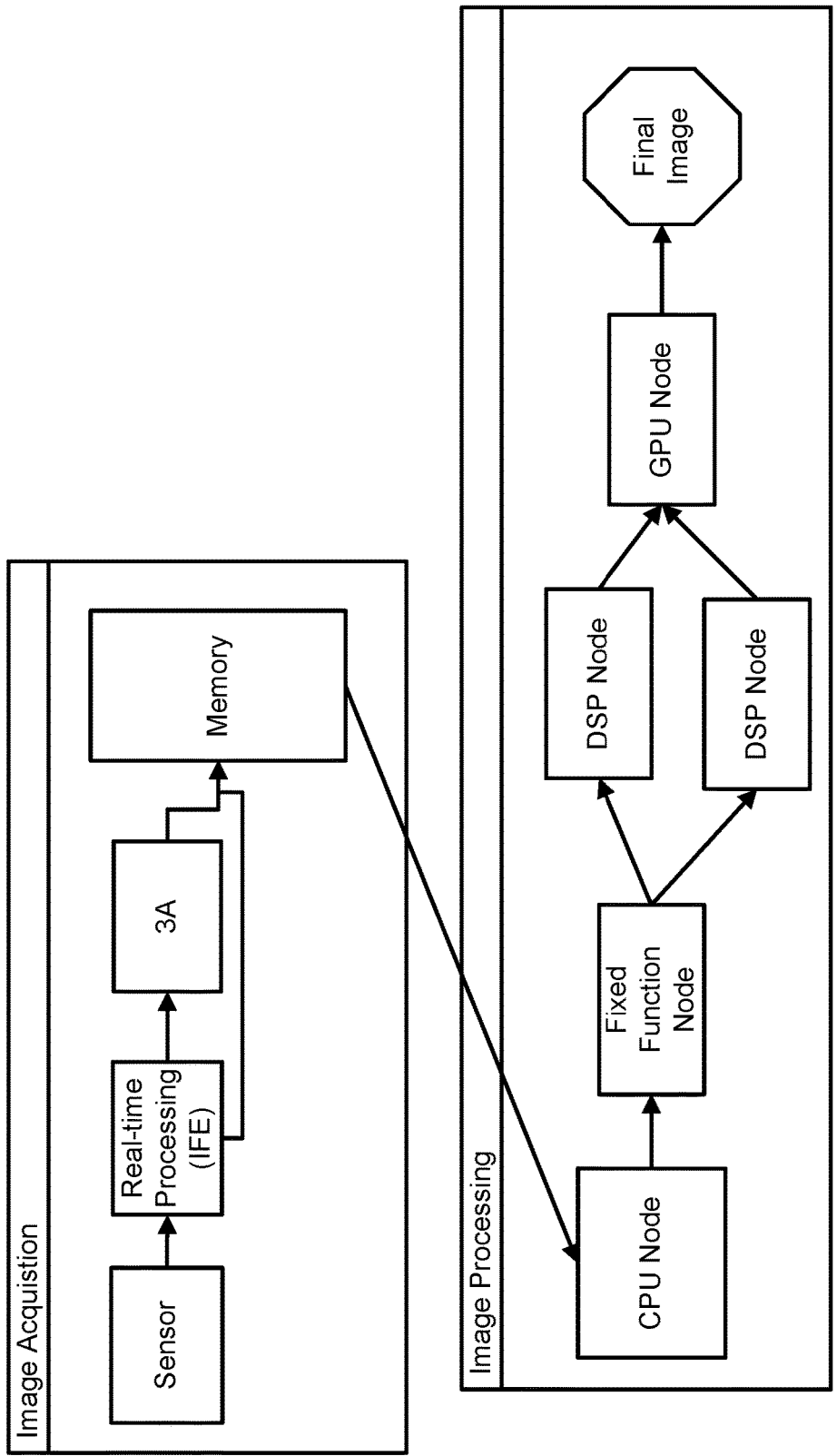
FIG. 5 is a conceptual diagram illustrating an example custom topology.

As described above, XML file 122 may include other topologies that include processing engines both internal and external to camera processor 14. In addition, XML file 122 may be edited to define any custom topology using any available processing engines on computing device 10. FIG. 5 is a conceptual diagram illustrating an example custom topology. In the example extended topology 240, the image acquisition stage may the same as default topology 230. However, the image processing stage may include processing engines that are both internal and external to camera processor 14, including processing nodes executed with CPU 16, DSP 19, and GPU 18.

The following describes one example of how XML file 122 may define both default and custom topologies for a particular camera use case. The hardware and software image processing nodes are used to produce desired output, and the connections between those nodes determine how data flows through the camera subsystem. This set of nodes and connections is called a topology. A use case is defined by a set of targets to be processed, and a set of per-session settings which further define how the data should be processed. Each use case is represented by a topology, which is the connection between the information passed into existing camera interface 104 (e.g., the HAL3 API), and the concrete definition of how to process the data.

The list of all the use cases and their corresponding topologies may be encoded in an XML file (e.g., XML file 122 of FIG. 2). A use case is selected during a configure_streams command based on two sections in the XML: <Targets> and <SystemwideSettings>. An XSD schema, which defines the structure of the XML, may be provided to developers for adding use cases and topologies to XML file 122. Tools are provided to package the XML files as an offline binary for consumption by camera API 21.

A node is a hardware or software processing component in a topology. This includes default nodes provided by camera processor 14, as well as custom nodes external to camera processor 14, which can be provided by any hardware with access to camera API 21. A node has a set of inputs and a set of outputs that are individually referred to as input port and output port.

An output port that outputs to an image buffer (e.g., a HAL3 image buffer) is referred to as a "SinkBuffer" output port. There may be output ports that do not output to any image buffer and are used to signal that a node is in use, however it does not output any buffers. These may be marked as "SinkNoBuffer" output ports.

A DAG in a topology is formed by connecting the input ports of a node to the output ports of another node, or in case of a feedback loop, the output port of a node may be connected to its own input port. The connection between input ports and output ports is referred to as a link, which also contains information about the buffers used between nodes.

In one example, XML file 122 begins with a prolog, which is the first entry in the XML file. The XML prolog contains information that applies to the document as a whole and is declared as follows:
<?xml version="1.0" encoding="utf-8" ?>
XML file 122 may contain one root tag that is the parent of all other tags. <UsecaseDef> is the root tag of the topology XML and it follows the Prolog. Individual use cases are defined within this root tag. The root tag with its attributes is defined as follows:

```
<UsecaseDef xmlns:xsi=http://www.w3.org/2001/XMLSchema-instance
xsi:noNamespaceSchemaLocation="topology.xsd">
```

XML file 122 ends with the closing of the root tag as </UsecaseDef>. Everything in the XML file other than the prolog, lives between <UsecaseDef> </UsecaseDef>

Use cases are defined with the <Usecase> tag. Information related to a single use case exists between <Usecase></Usecase>. Such information includes the keys for matching the use case, as well as the topology which defines the use case.

Valid tags include:
<UsecaseName>—Value field. Exactly 1 tag is used.
<Targets>—Exactly 1 is used.
<StreamConfigMode>—Value field. Exactly 1 is used.
<SystemwideSetting>—Exactly 1 is used.
<Topology>—At least 1 is used.

<Targets> defines a list of streams, including formats, and ranges of sizes that the use case executes on. The streams listed here correspond to the streams passed into the HAL3 configure_streams( ) API.

Valid tag includes:
<Target>—At least 1 is uses.

The <Target> is a description of a single stream or target. Individual tag values in this section are compared with the stream configuration passed into configure_streams( ) to find a matching <Usecase>. <Target> and <SystemwideSettings> are used to select a <Usecase> from the XML.

Valid tags include:
<TargetName>—Value field. Exactly 1 is used.
<TargetDirection>—Value field. Exactly 1 is used.
<TargetFormat>—Value field. At least 1 is used.
<Range>—Exactly 1 is used.

<Range> defines the resolution of the buffer and the incoming resolution of the buffer in configure_streams( ) falls within this range for the <Usecase> to be selected as a matching use case for the input stream configuration.

Valid tags include:
<MinW>—Value field. Exactly 1 used.
<MinH>—Value Field. Exactly 1 used.
<MaxW>—Value Field. Exactly 1 used.
<MaxH>—Value Field. Exactly 1 used.

The following is an example sample with one target:

```
<Targets>
    <Target>
        <TargetName>TARGET_BUFFER_PREVIEW</TargetName>
        <TargetDirection>TargetOutput</TargetDirection>
        <Formats>YUV420NV12</Formats>
        <Range>
            <MinW>0</MinW>
            <MinH>0</MinH>
            <MaxW>1920</MaxW>
            <MaxH>1080</MaxH>
        </Range>
    </Target>
</Targets>
```

While camera API 2 is processing configure_streams( ), if there is an output stream with a YUV420NV12 formatted output buffer of any resolution less than or equal to 1080p, it will match the <Targets> section mentioned above.

<SystemwideSettings> specify a group of per-session settings, which when combined with the <targets> tag, defines the key for this use case. These settings may be configured correspond to Android properties.

Valid tag includes:

<Setting>—At least 1 is used.

The <Setting> is a description of the setting to be used to select this use case.

Valid tags include:

<SettingName>—Value field. Exactly 1 is used.
<SettingDataType>—Value field. Exactly 1 is used
<SettingMatch>—Value field. Exactly 1 is used <Topology> specifies the camera pipeline for this use case. The topology is what is used by camera API 21 to determine the ordering and dependencies of each node when processing a request. A topology is defined by a list of nodes, and a list of the links between those nodes.

Valid tags include:

<TopologyName>—Value field. Exactly 1 is used.
<TopologyNodesList>—Exactly 1 is used.
<PortLinkage>—At least 1 is used.

<TopologyNodesList> is a list of nodes to be included in this topology. This list of nodes is linked together to form the processing graph.

Valid tag includes:

<Node>—At least 1 is used.

<Node> is a single representation of a processing node that tells camera API 21 how to process a request.

Valid tags include

<NodeProperty>—Optional. Several properties allowed.
<NodeName>—Value field. Exactly 1 is used.
<NodeId>—Value field. Exactly 1 is used.
<NodeInstance>—Value field. Exactly 1 is used.
<NodeInstanceId>—Value field. Exactly 1 is used.

An example node is defined below:

```
<Node>
    <NodeProperty>
        <PropertyName>PropXYZ</PropertyName>
        <PropertyDataType>UINT</PropertyDataType>
        <PropertyValue>6</PropertyValue>
    </NodeProperty>
    <NodeName>NodeXYZ</NodeName>
    <NodeId>1</NodeId>
    <NodeInstance>NodeXYZInstanceName0</NodeInstance>
    <NodeInstanceId>0</NodeInstanceId>
</Node>
```

Camera API 21 interprets the nodeId to understand the exact node type. For all custom nodes, this field has a value of 255, which along with a specific NodeProperty informs Camera API 21 of the exact custom node type. An example custom node is shown below.

```
<Node>
    <NodeProperty>
        <PropertyName>CustomNodeLibrary</PropertyName>
        <PropertyDataType>STRING</PropertyDataType>
        <PropertyValue>customnodelib.so</PropertyValue>
    </NodeProperty>
    <NodeName>CustomNode</NodeName>
    <NodeId>255</NodeId>
    <NodeInstance>CustomNodeInstanceName0</NodeInstance>
    <NodeInstanceId>0</NodeInstanceId>
</Node>
```

<NodePortLinkage> specifies the linkage between nodes. A topology is essentially a list of nodes and how they are interconnected with each other. This section describes the links between the nodes in <Topology>.

Valid tags include:

<SourceNode>—Value field. Exactly 1 is used.
<SourceNodeInstance>—Value field. Exactly 1 is used.
<Link>—At least 1 is used.

<Link> defines a single link between nodes.

Valid tags include

<SrcPort>—Exactly 1 is used.
<DstPort>—At least 1 is used.
<BufferProperties>—Optional.

The <SrcPort> of a link is the output port of a node that generates the image buffer to be consumed by the destination input port's<DstPort>. There is a one-to-many mapping from <SrcPort> to <DstPort>.

Valid tags include:

<PortName>—Value field. Exactly 1 is used.
<PortId>—Value field. Exactly 1 is used.
<NodeName>—Value field. Exactly 1 is used.
<NodeId>—Value field. Exactly 1 is used.
<NodeInstance>—Value field. Exactly 1 is used.
<NodeInstanceId>—Value field. Exactly 1 is used.

<DstPort> in a link is the input port of a node that receives its input from the <SrcPort> to which it is connected.

Valid tags include:

<PortName>—Value field. Exactly 1 is used.
<PortId>—Value field. Exactly 1 is used.
<NodeName>—Value field. Exactly 1 is used.
<NodeId>—Value field. Exactly 1 is used.
<NodeInstance>—Value field. Exactly 1 is used.
<NodeInstanceId>—Value field. Exactly 1 is used.

<BufferProperties> describes the properties of the buffer that is output by an <SrcPort>, and received as input on all the DstPorts to which the <SrcPort> is connected.

Valid tags include

<BatchMode>—Value field. Exactly 1 is used.
<BufferFormat>—Value field. Exactly 1 is used.
<BufferQueueDepth>—Value field. Exactly 1 is used.
<BufferHeap>—Value field. Exactly 1 is used.
<BufferFlags>—Value field. Exactly 1 is used As one example, to specify that a streams output buffer is generated by a node named "NodeXYZ", the following is done within the <Link> tag:

```
<Link>
    <SrcPort>
        <PortName>IFEOutputPortFull</PortName>
        <PortId>0</PortId>
        <NodeName>IFE</NodeName>
        <NodeId>65536</NodeId>
        <NodeInstance>IFEInstanceName0</NodeInstance>
        <NodeInstanceId>0</NodeInstanceId>
    </SrcPort>
    <DstPort>
        <PortName>IPEInputPortFull</PortName>
        <PortId>0</PortId>
        <NodeName>IPE</NodeName>
        <NodeId>65538</NodeId>
        <NodeInstance>IPEInstanceName0</NodeInstance>
        <NodeInstanceId>0</NodeInstanceId>
    </DstPort>
    <BufferProperties>
        <BatchMode>false</BatchMode>
        <BufferFormat>YUV420NV12</BufferFormat>
        <BufferQueueDepth>8</BufferQueueDepth>
        <BufferHeap>Ion</BufferHeap>
        <BufferFlags>MemFlagHw</BufferFlags>
    </BufferProperties>
</Link>
```

The following tags specify the values to be used by the encapsulating tags. The tags cannot have additional tags embedded inside them.

<UsecaseName> may be any string used to identify a use case.

<TargetName> may be a one word string that is used to map the output buffer of this stream to the output port of a node in a topology, that is, it is used to specify that the content of the output buffer of this stream is generated by a node in the topology. <DstPort> within a <Link> tag contains the string in the <TargetName> tag to associate the node's output with this stream's output buffer.

<TargetDirection> specifies the stream direction (or stream type), that is, whether the stream is an input stream, output stream, or is bidirectional. Input stream specifies an input buffer, output stream specifies an output buffer, and bidirectional specify buffers that act as input or output.

Valid values may include:

TargetOutput
TargetInput
TargetBidirectional

<TargetFormat> specifies the format of the buffer associated with the stream.

More than one such element is allowed to specify that if either of the formats listed with these elements match the configuration given at configure_streams( ), it should be considered a use case match and the corresponding topology will be used for the use case.

Valid values include:

Jpeg
Y8
Y16
YUV420NV12
YUV420NV21
YUV422NV16
Blob
RawYUV8BIT
RawQCOM
RawMIPI
RawPlain16
RawMeta8BIT
UBWCTP10
UBWCNV12
UBWCNV124R <MinW> specifies the minimum width of a buffer. Used by the <Range> tag.

Valid value includes:
Unsigned 32-bit integer, which must be less than <MaxW>.

<MinH> specifies the minimum height of a buffer. Used by the <Range> tag.

Valid value includes:
Unsigned 32-bit integer, which must be less than <MaxH>.

<MaxW> specifies the maximum width of a buffer. Used by the <Range> tag.

Valid value includes:
Unsigned 32-bit integer, which must be less than <MinW>.

<MaxH> specifies the maximum height of a buffer. Used by the <Range> tag.

Valid value includes:
Unsigned 32-bit integer, which must be less than <MinH>.

<TopologyName> is an informative name for the topology and may be any string.

<NodeName> is a descriptive name of the node and may be any string that is a valid C variable.

<NodeId> is an ID used to identify a node. These IDs are used to link the node's ports to each other.

<NodeInstance> is a descriptive name of a node instance and may be any string that is a valid C variable.

<NodeInstanceId> is an ID used to identify a unique instance of a node. These IDs are used to link the node's ports to each other.

Valid value includes: Unsigned 32-bit integer, which corresponds to a unique instantiation of a node of the same engine type.

<SettingName> is a string describing the name of the setting.

<SettingDataType> is a string describing the C-type of the variable.

Valid values include:

INT
UINT
FLOAT
BOOL
STRING

<SettingMatch> is a string describing the C-type of the variable.

<SourceNode> is an ID used to identify a node. These IDs are used to link the node's ports to each other.

<SourceNodeInstance> is an ID used to identify a unique instance of a node.

These IDs are used to link the node's ports to each other.

Valid value includes: Unsigned 32-bit integer, which must correspond to a unique instantiation of a node of the same engine type.

<PortName> is a descriptive name of a port as a string.

<PortId> is an ID used to identify a port. These IDs are used to link the node's ports to each other.

<BatchMode> specifies if batching is necessary. Generally, this is only required when in a high frame rate (HFR) mode, to allow camera processor 14 to process multiple frames in a single hardware submission. An HFR mode may include a mode where multiple images are batched together into a single time slice. For example, 120 frames per second (fps) can be achieved by packing four separate images into each 33 ms window, when a processing engine is operating at 30 fps. It is only required for links that cannot operate offline.

Valid value includes:
0 to disable batch mode, 1 to enable it.

<BufferFormat> specifies the format of a buffer.

Valid values include:

Jpeg
Y8
Y16
YUV420NV12
YUV420NV21
YUV422NV16
Blob
RawYUV8BIT
RawQCOM
RawMIPI
RawPlain16
RawMeta8BIT
UBWCTP10
UBWCNV12
UBWCNV124R <BufferQueueDepth> specifies the maximum number of buffers that are created for a link.

<BufferHeap> specifies the heap from which to allocate the buffer. Used to allow allocations to be visible outside of camera processor 14

Valid values include:

```
System
Ion
DSP
EGL
```

<BufferFlags> specify usage information describing how the buffer is used. For example, MemFlagWriteAccess is set if a node writes to a buffer.

Valid values include

```
MemFlagHw
MemFlagProtected
MemFlagCmdBuffer
MemFlagUMDAccess
MemFlagCache
MemFlagPacketBuffer
MemFlagKMDAccess
```

Figure 6:
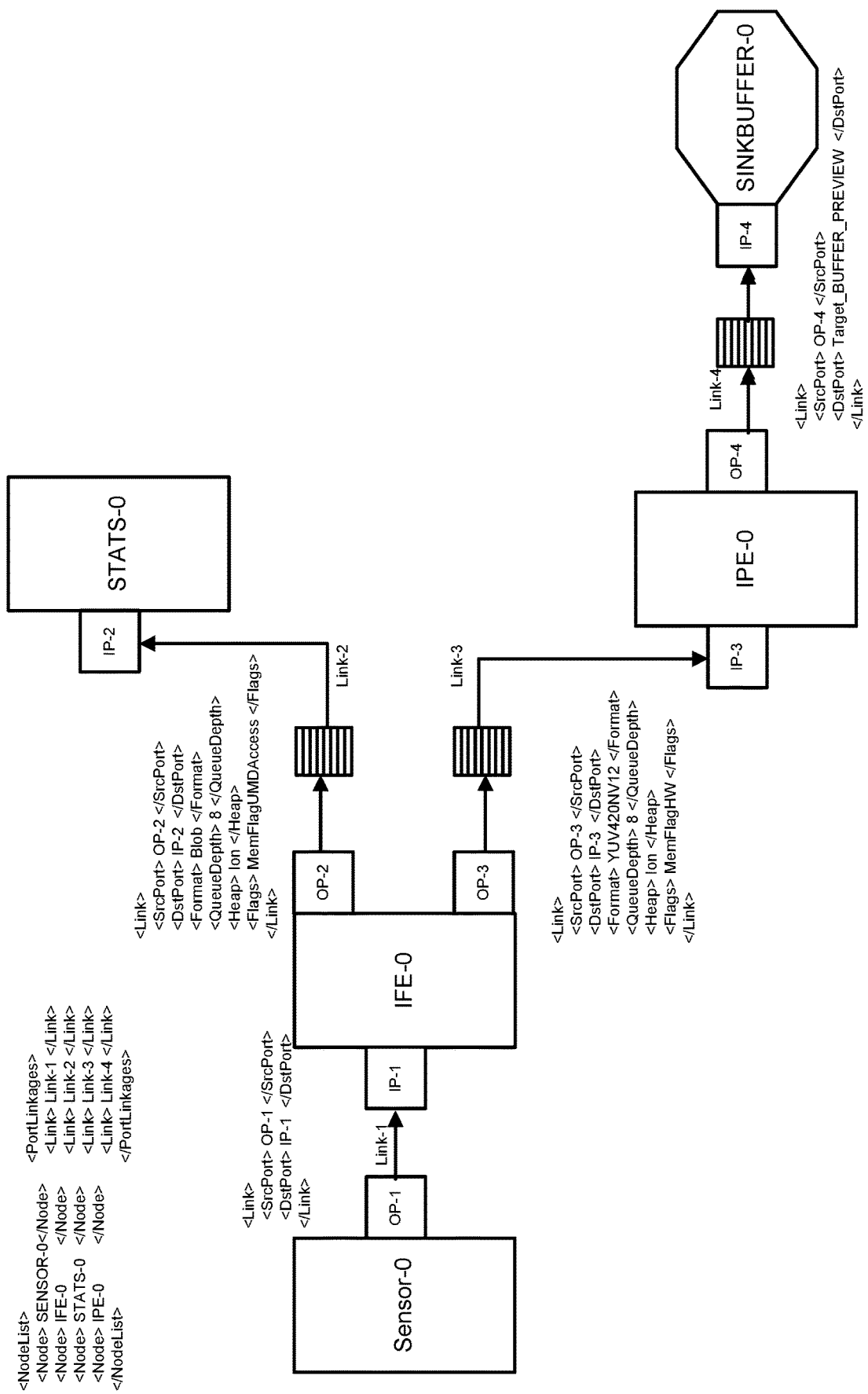
FIG. 6 is a block diagram illustrating a camera pipeline as defined by a topology.
Figure 7:
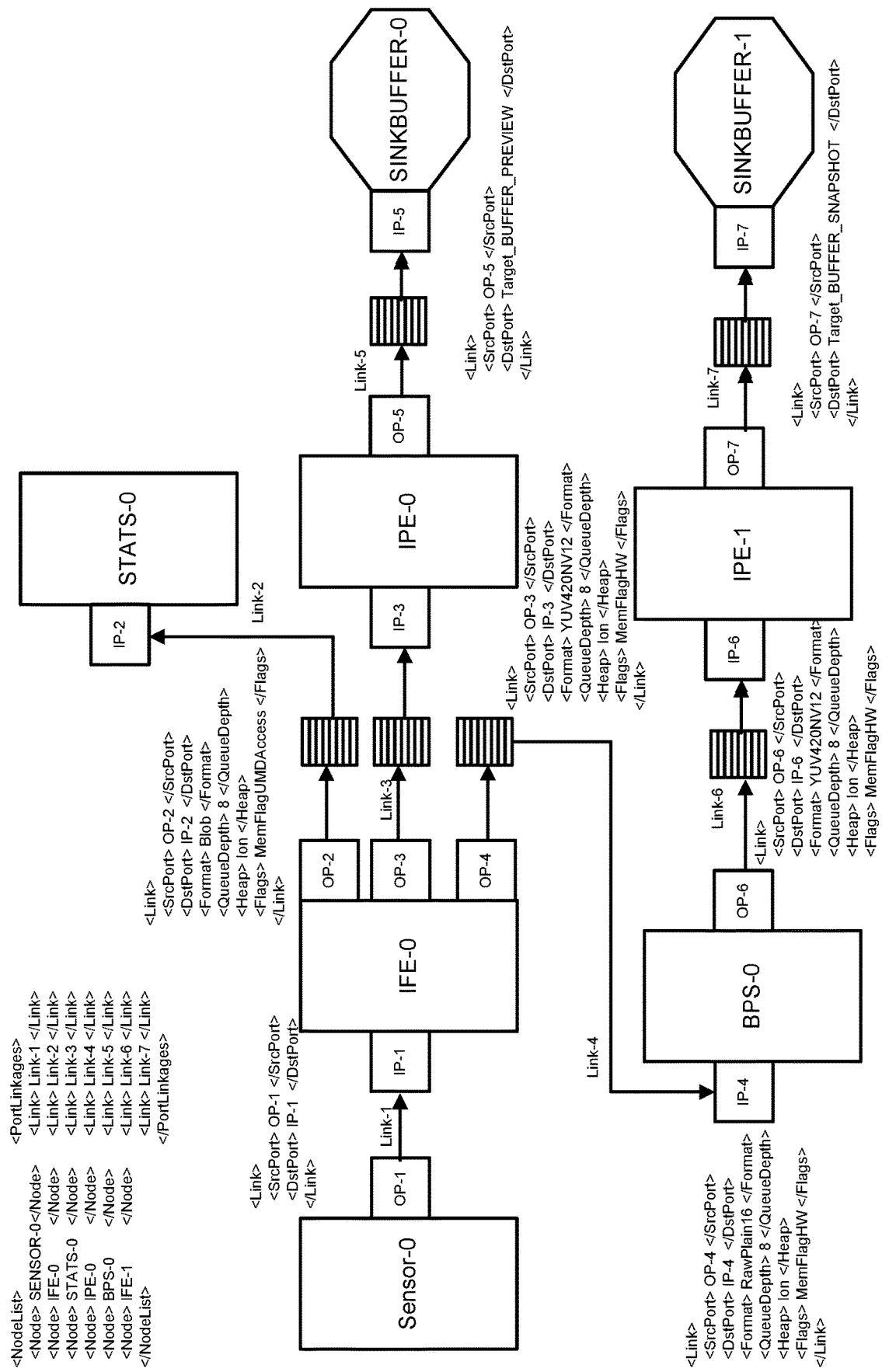
FIG. 7 is a block diagram illustrating a camera pipeline for a snapshot with preview use case.
Figure 8:
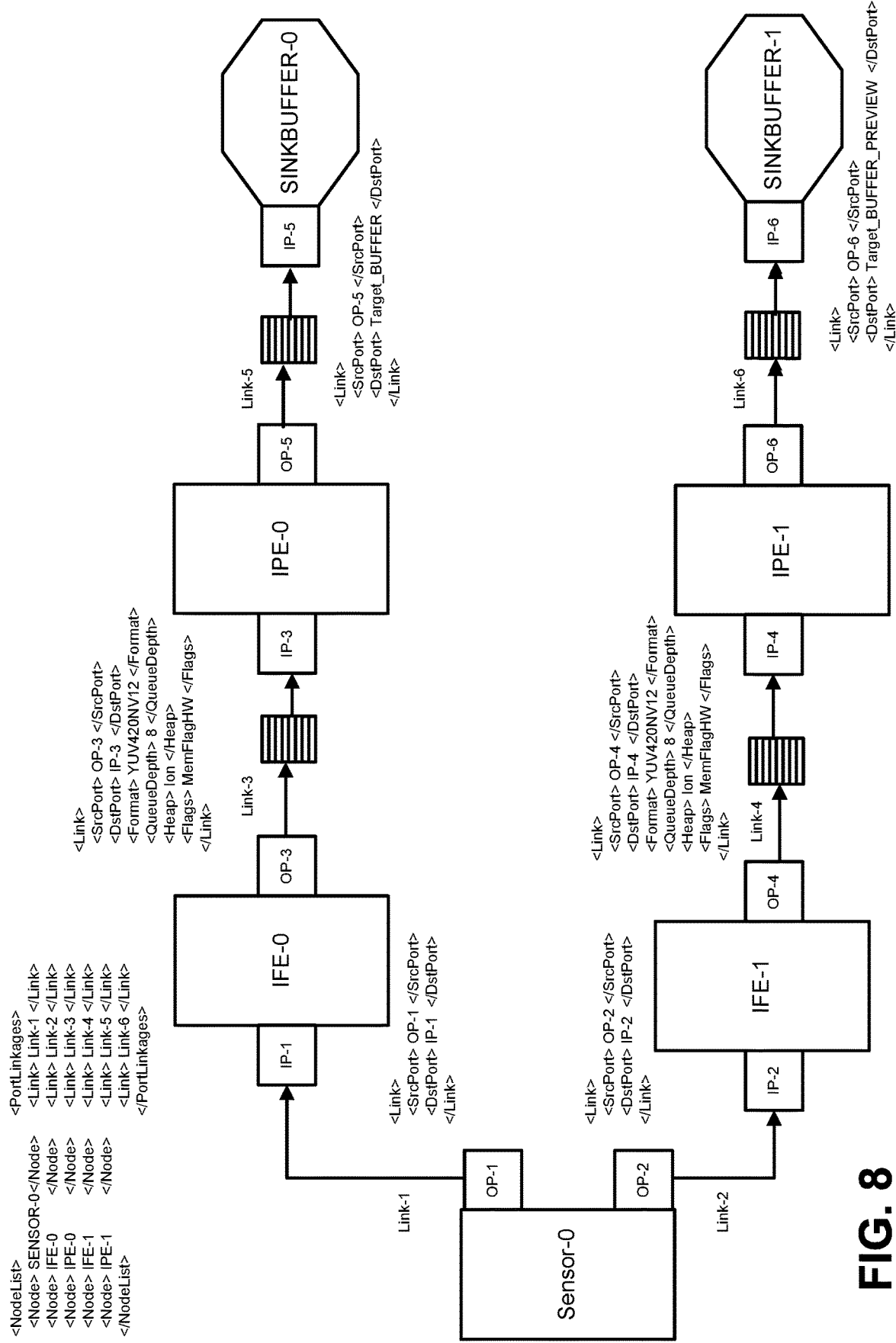
FIG. 8 is a block diagram illustrating a dual stream use case.

The above-defined data structures of XML file 122 define a topology for a camera pipeline for a particular use case. FIGS. 6-8 show example camera pipelines defined using the data structures discussed above. FIG. 6 is a block diagram illustrating a camera pipeline for a camera preview as defined by an example XML topology. FIG. 7 is a block diagram illustrating a camera pipeline for a snapshot with preview use case. FIG. 8 is a block diagram illustrating a dual stream use case.

Figure 9:
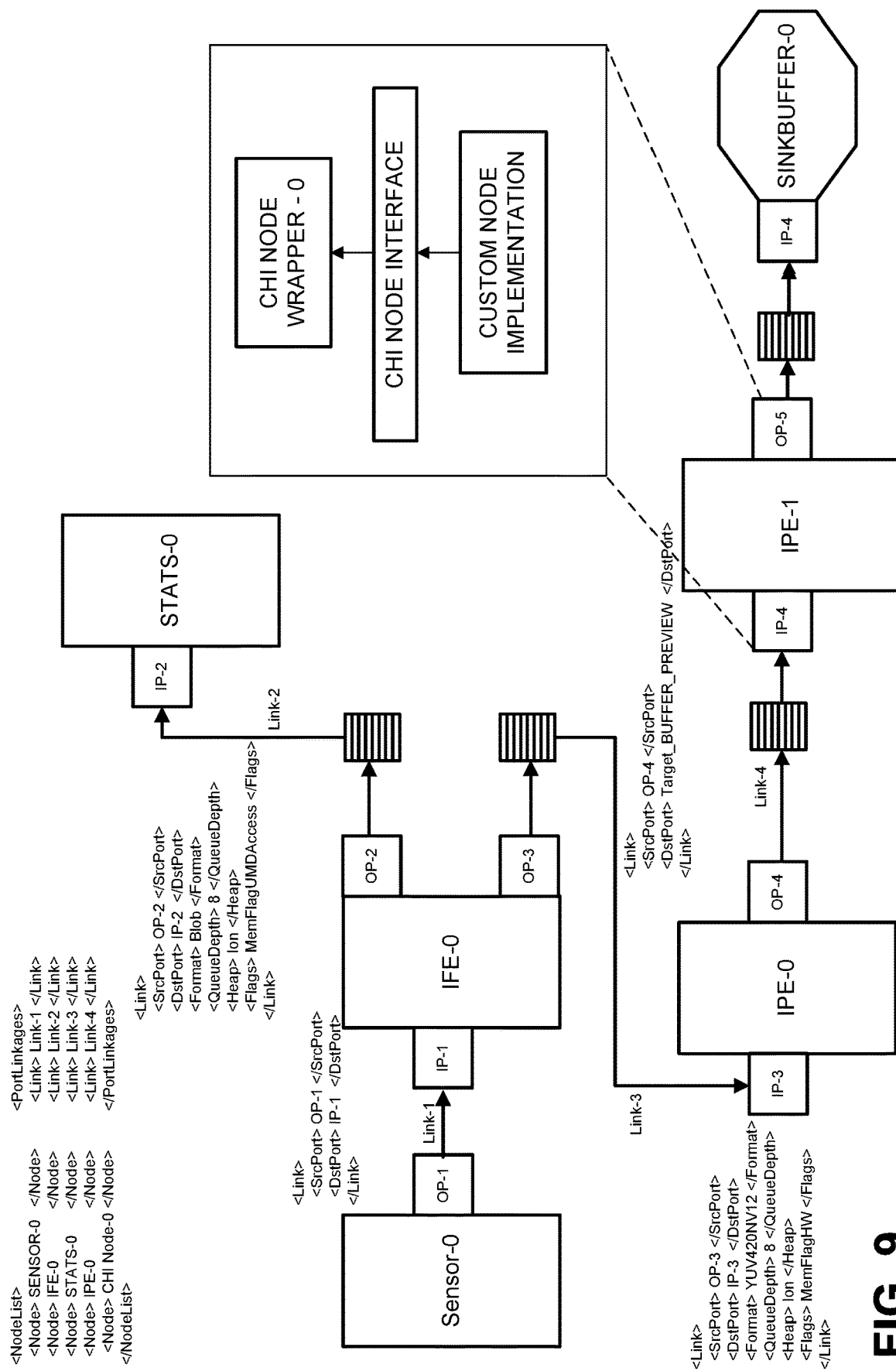
FIG. 9 is a block diagram illustrating a camera pipeline with a custom node.
Figure 10A:
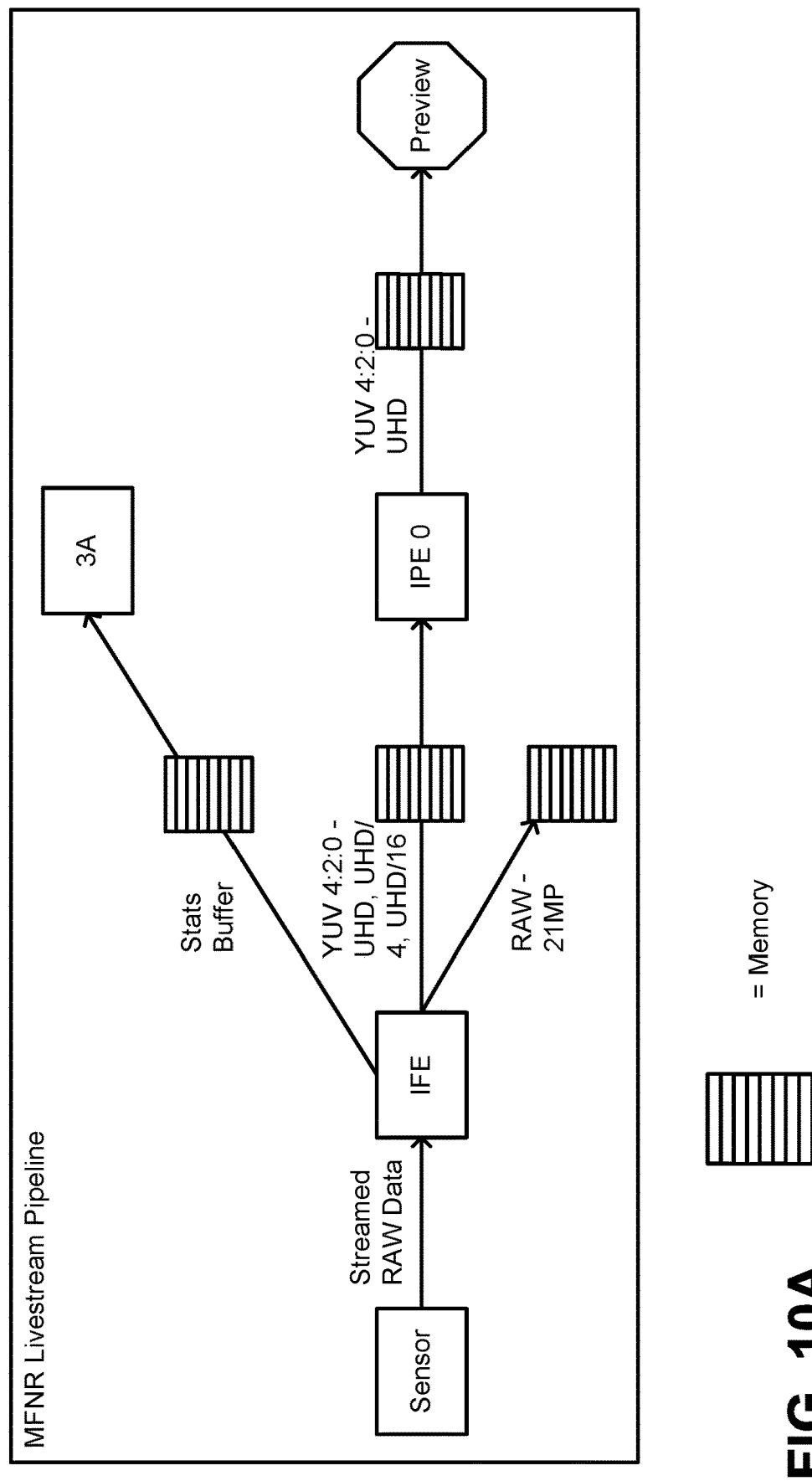
FIG. 10A-10D are block diagrams illustrating a camera pipeline for a zero shutter lag and multi-frame noise reduction (ZSL-MFNR) use case.
Figure 10B:
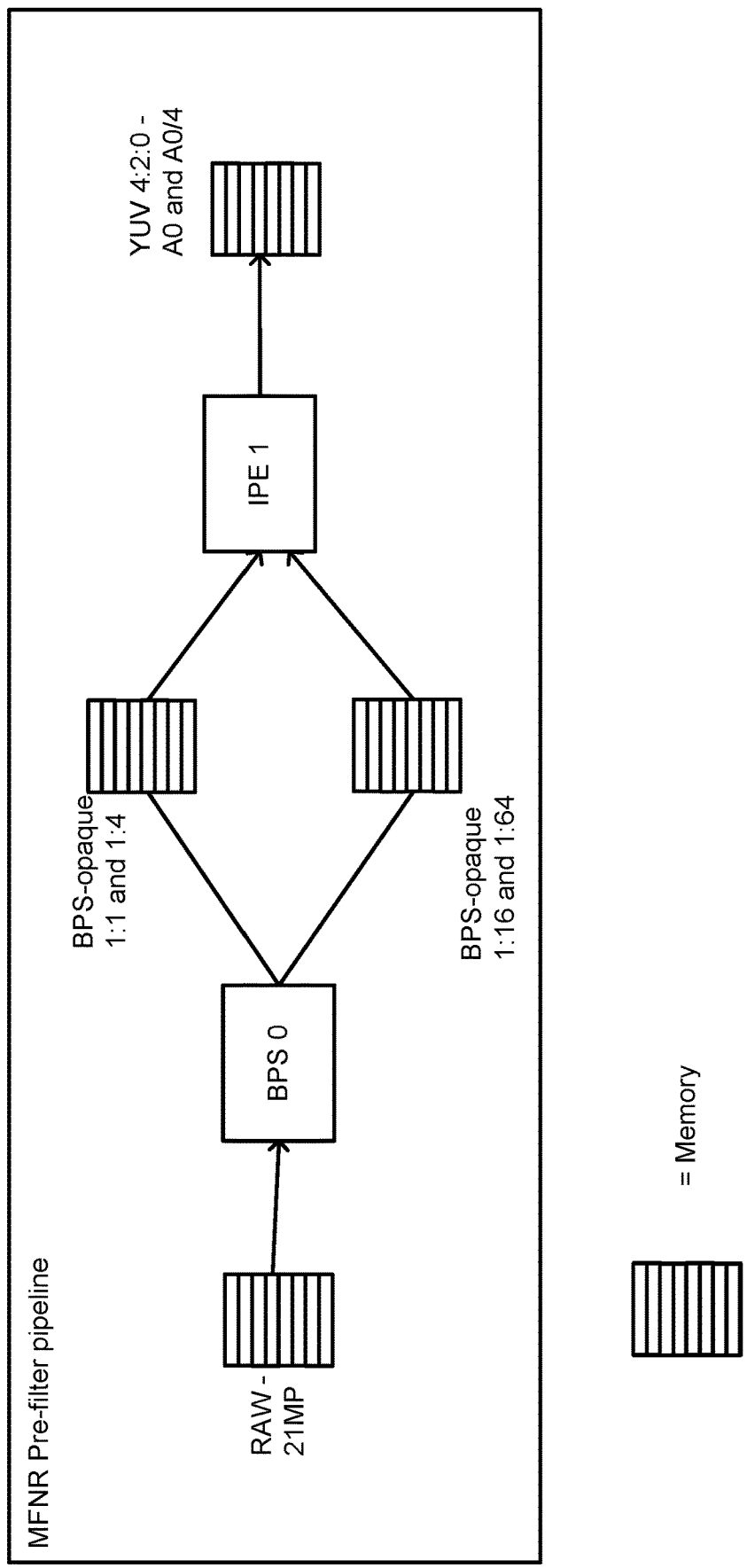
Figure 10C:
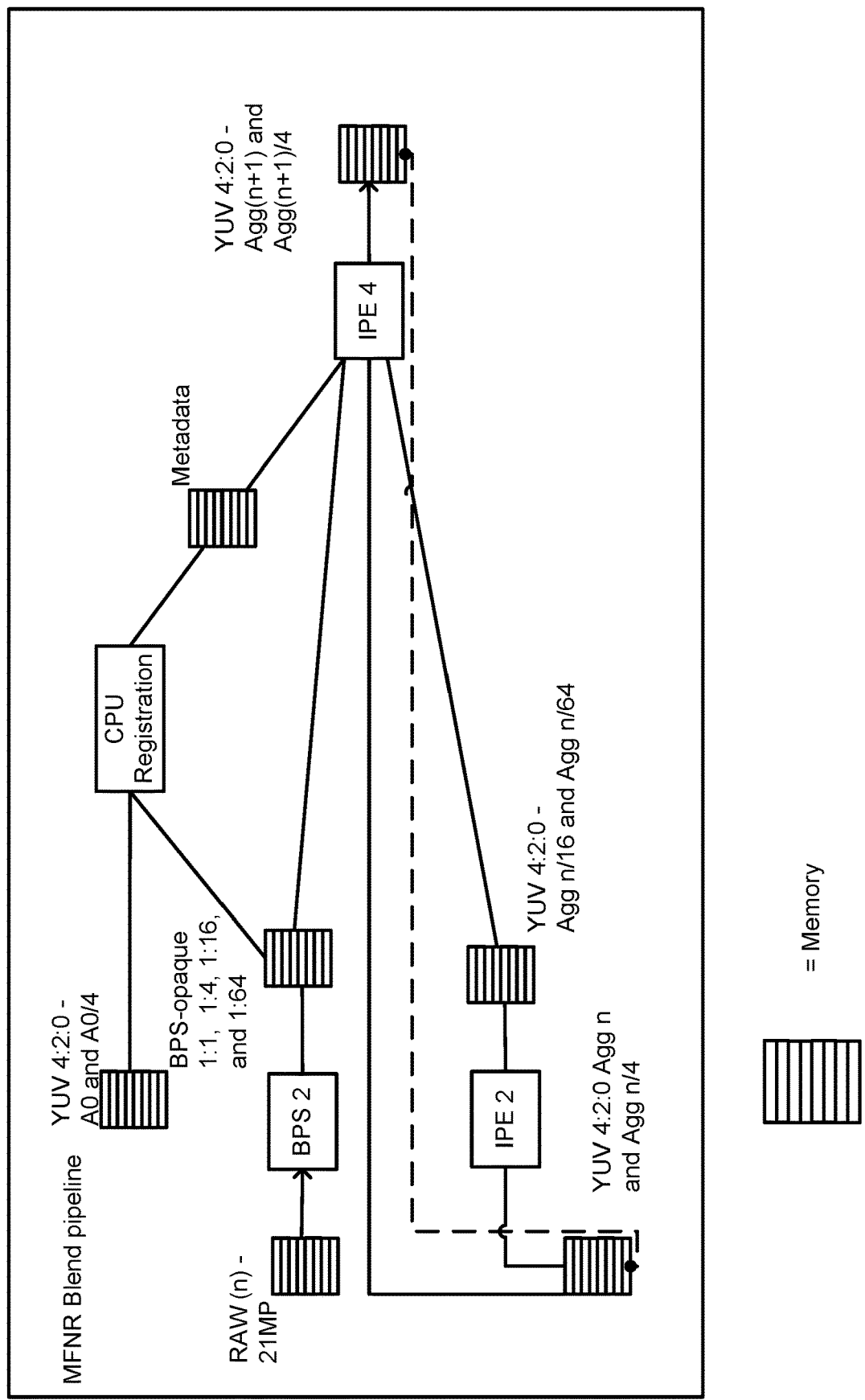
Figure 10D:
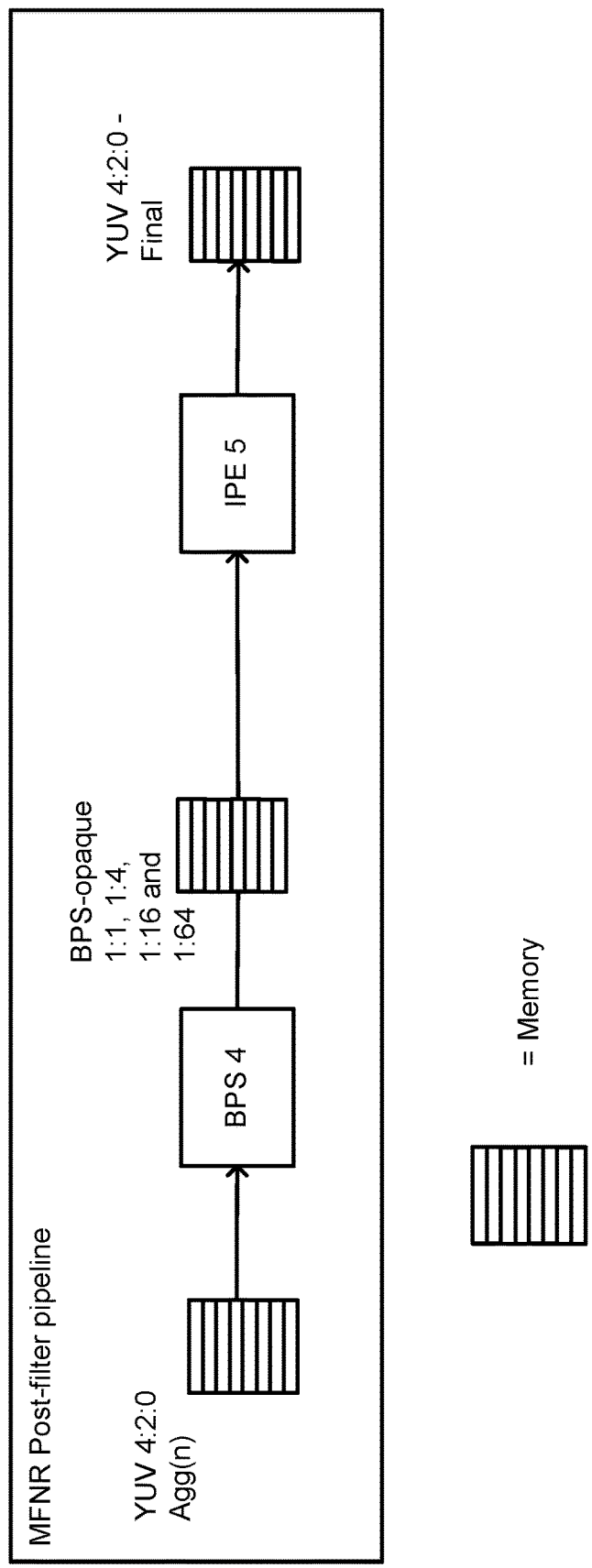

FIG. 9 is a block diagram illustrating a camera pipeline with a custom node. The CHI node (e.g., implemented using CPU 16) in this sample use case is used to derive a warping transform. The warping transform is generated by the frame registration of an anchor frame and an additional blending frame. The warping transform may be used in a multi-frame noise reduction (MFNR) blending stage by an IPE of camera processor 14. The CHI node may be configured to publish a vendor tag for warping transform which is available for the IPE node. The details of the CHI node interface implementation by the CHI node is described below.

The CHI node may be configured to perform a registration of the warping transform-related vendor tag. The vendor tag is assigned a dynamic base with which the CHI node adds tag offset to generate a vendor tag.

Node-to-node communication may be performed through a publish and subscribe mechanism. The metadata tags (e.g., Android tags or vendor tags, as described below) are the inter-node communication elements to which nodes subscribe, while other nodes publish them in the topology. The metadata slot is available to nodes during request processing, which provides the necessary metadata.

To get the metadata, external nodes to camera processor 14 (ExtNodes) are made aware of the corresponding vendor component section base. The ExtNode can get the section base from CHI interface 118 during the initial phase. These section bases are assigned by camera API 21 for components (e.g., processing engines) during initialization. ExtNodes are expected to provide all the vendor tags (tag=VendorComponentSectionBase+TagOffset), when camera API 21 queries the node to report the dependencies.

Camera API 21 subscribes to the dependencies reported by the ExtNodes and upon availability of all the dependencies, Camera API 21 calls back the ExtNode to process the request.

ExtNodes can publish metadata by setting the tag that it had previously enumerated during initialization, as one of the tags that is published by the respective node. Camera API 21 notifies all the other submitted nodes that reported dependency for the specific tag. This mechanism is the same for Android tags, ChiVendorTags, or other ExtCompVendorTags.

FIG. 10A-10D are block diagrams illustrating a camera pipeline for a zero shutter lag and multi-frame noise reduction (ZSL-MFNR) use case. CHI override module 108 may be configured to extend existing camera interface 104 (e.g., HAL3) for a ZSL snapshot use case. In addition, CHI override module 108 provides details of how a multi-frame feature like multi-frame noise reduction (MFNR) can be implemented using the camera API 21.

CHI override module 108 may have the following functionality requirements when implementing the ZSL MFNR snapshot use case:
- Ability to create and manage multiple sessions and associated pipelines
- ZSL snapshot use a real-time pipeline with RAW internal target output and at least one additional offline session
- MFNR uses an additional offline sessions for prefilter, blend, and postfilter stages
- Ability to control the request and result flow across the session
- Ability to generate internal requests in response to framework request
- Ability to accumulate the internal results and generate the final framework result
- Ability to manage ZSL queue of buffers (image and metadata)
- Ability to control the inter-session buffer, fence, and metadata associations
- Ability to support an anchor frame picking logic Multi-frame noise reduction involves complex sequencing of frame processing through camera processor 14. There are different stages of processing, namely MFNR Livestream pipeline (FIG. 10A), MFNR Pre-filter pipeline (FIG. 10B), MFNR Blend pipeline (FIG. 10C), and MFNR Postfilter pipeline (FIG. 10D), which invoke different pipelines. Each of the memories shown in FIGS. 10A-10D are labeled with the format of image data or metadata stored in each of the memories. The processing nodes (e.g., IPE, IFE, BPS, 3A etc.) in these pipelines may be instantiated with different capabilities depending on the stages of processing. For example, the mode of operation based on the capabilities requested on IPE hardware for the MFNR Pre-filter pipeline is different from the MFNR Blend pipeline. To that extent, processing nodes labeled with different numbers (e.g., IPE-1 vs IPE-2) may be configured to perform different operations. CHI override module 108 instantiates different real-time and offline pipelines to implement the MFNR ZSL snapshot.

CHI override module 108 is initialized during the camera server process boot-up. Existing camera interface 104 from camera API driver 21 invokes chi_initialize_override_session into CHI override module 108, so that CHI override module 108 can inspect the stream configurations, and decide whether to override or ignore the use case. CHI override module 108 checks whether the stream configurations indicate a requirement for HAL-ZSL, using format, stream_type, and usage flags. If the conditions for the ZSL use case are met, CHI override module 108 creates overridden real-time and offline pipelines. A custom real-time pipeline is created by calling chi_create_pipeline with the real-time pipeline topology descriptor. The real-time pipeline has a RAW_TARGET, in addition to the PREVIEW_TARGET, to be able to receive the raw ZSL buffers. CHI override module 108 returns the newly created real-time pipeline handle to the driver.

Camera API 21 provides every request issued by the framework to the CHI override module 108 by calling chi_override_process_request. If camera application 102 requires a preview buffer only, CHI override module 108 only provides the request, buffers, and setting to the preview stream. CHI override module 108 intercepts the request from the camera framework and appends additional requests for the raw target. The necessary internal buffer for the raw target is allocated and managed by t CHI override module 108. The modified request is submitted to camera API 21 using chi_submit_pipeline_request, using the real-time session handle.

The result from camera API 21 is received only after both the target buffer fences have been signaled. Camera API 21 invokes chi_override_result_notify to enable CHI override module 108 to intercept the result. CHI override module 108 extracts the raw target buffer along with metadata and pushes them in the ZSL queue. This is repeated for every preview request that is issued by the application framework.

Camera application 102 sends a request for both the streams reflecting the snapshot action by the user. As in the case of preview, CHI override module 108 receives the request through chi_override_process_request. CHI override module 108 interprets the need for ZSL frame from the request. The absence of an MFNR vendor tag indicates to CHI override module 108 to execute a regular ZSL snapshot. CHI override module 108 processes the regular flow of internal request addition to the raw target in a real-time session. In addition to this, CHI override module 108 also marks two internal requests, one for raw Bayer to YUV processing using offline session_1, and one for YUV to JPEG processing using offline session_2. This marking helps generate internal requests to the pipelines later. CHI override module 108 has access to the buffers and associated fences that are being configured in different sessions. CHI override module 108 associates the buffer and fences appropriately between the sessions, to enable a seamless transfer of control.

For regular ZSL snapshots, CHI override module 108 proceeds to pop the top most frame from the ZSL queue along with its metadata, and submit the same to offline session_1 just after it has finished submitting the real-time request.

The result from real-time session follows the same sequence of operations like ZSL preview. When the result from offline session_1 is received by the CHI override module 108, CHI override module 108 generates an internal request based on the marking previously done for offline session_2. This request takes the YUV output from offline session_1 to generate a JPEG encoded snapshot. CHI override module 108 configures the offline session_2 to use the snapshot target buffer provided by the application framework.

Figure 11:
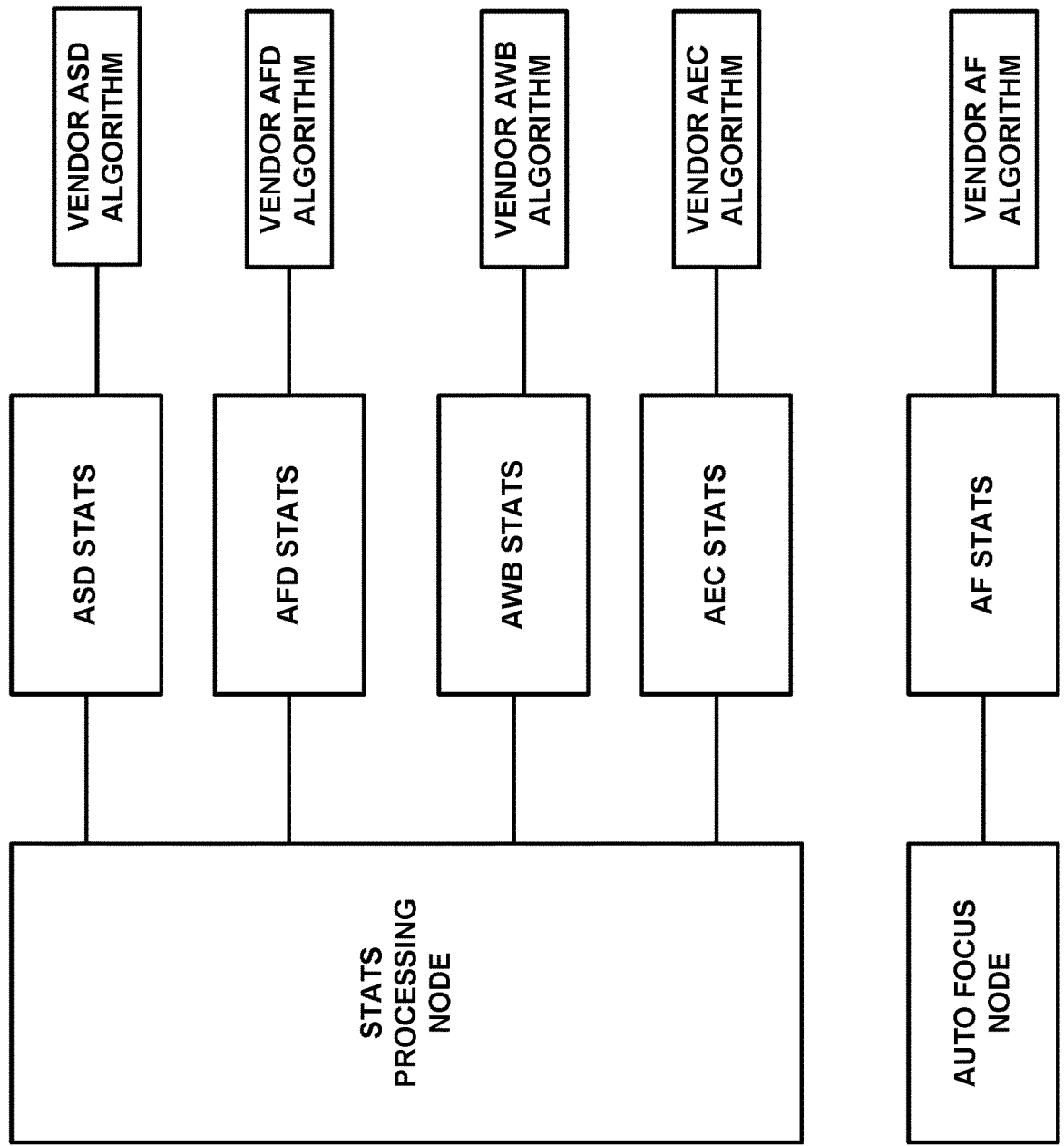
FIG. 11. is a conceptual diagram illustrating a statistics algorithm override use case.

FIG. 11. is a conceptual diagram illustrating a statistics algorithm override use case. Camera API 21, through CHI stats override module 110, provides developers the option of enhancing their camera product with their own statistics algorithm, or leveraging the default statistics algorithms. Developers can override default statistics algorithm with their own custom statistics algorithm. To achieve this goal, camera API 21 exposes a well-defined and robust interface (e.g., through CHI stats override module 110) providing forward and backward-compatibility for each of the statistics components. These interfaces are designed and defined to have binary and backward compatibility.

By sending commands to CHI stats override module 110 to override default statistics algorithms, developers can select the combination of statistics algorithms desired. FIG. 11 shows different statistic algorithms that developers can customize with their own implementation.

Auto Exposure Control (AEC) algorithm automatically adjusts camera sensor sensitivity settings under different lighting conditions, to achieve the best preview and capture experience.

Auto White Balance (AWB) is the process of removing unrealistic color casts. AWB takes into account the color temperature of the light source and output correlated color temperature (CCT) and RGB gains, which are consumed by the image signal processor.

Auto Focus (AF) algorithms may adjust the focal point of the camera. AF algorithms may include contras-based AF, PDAF, and a hybrid PDAF and contrast approach.

Auto Flicker Detection (AFD) algorithm detects flicker or banding when integration time is not an integer multiple of electrical power line frequency on CMOS sensor. AFD is also known as anti-banding detection.

Auto Scene Detection (ASD) algorithm detects the scene automatically and configures the required camera driver settings to get a better camera preview or video.

FIGS. 12A-12E is a sequence diagram that illustrates an example command flow according to one example of use case the disclosure. Starting at FIG. 12A, camera application 102 opens (step 1) a session with existing camera interface 104 (e.g., HAL3). Existing camera interface initializes CHI interface 118 of camera API 21 (step 2). The driver implementation of CHI interface 118 calls into CHI override module 108 using the command chi_hal_override_entry to set up the interface between existing camera interface 104 and Chi override module 108 (step 3). CHI override module 108 returns function interface pointers to CHI interface 118 (step 4) which may be passed to existing camera interface 104 (step 5) and camera application 102 (step 6). This handshake allows backward-compatible expansion of existing camera interface 104.

Figure 12A:
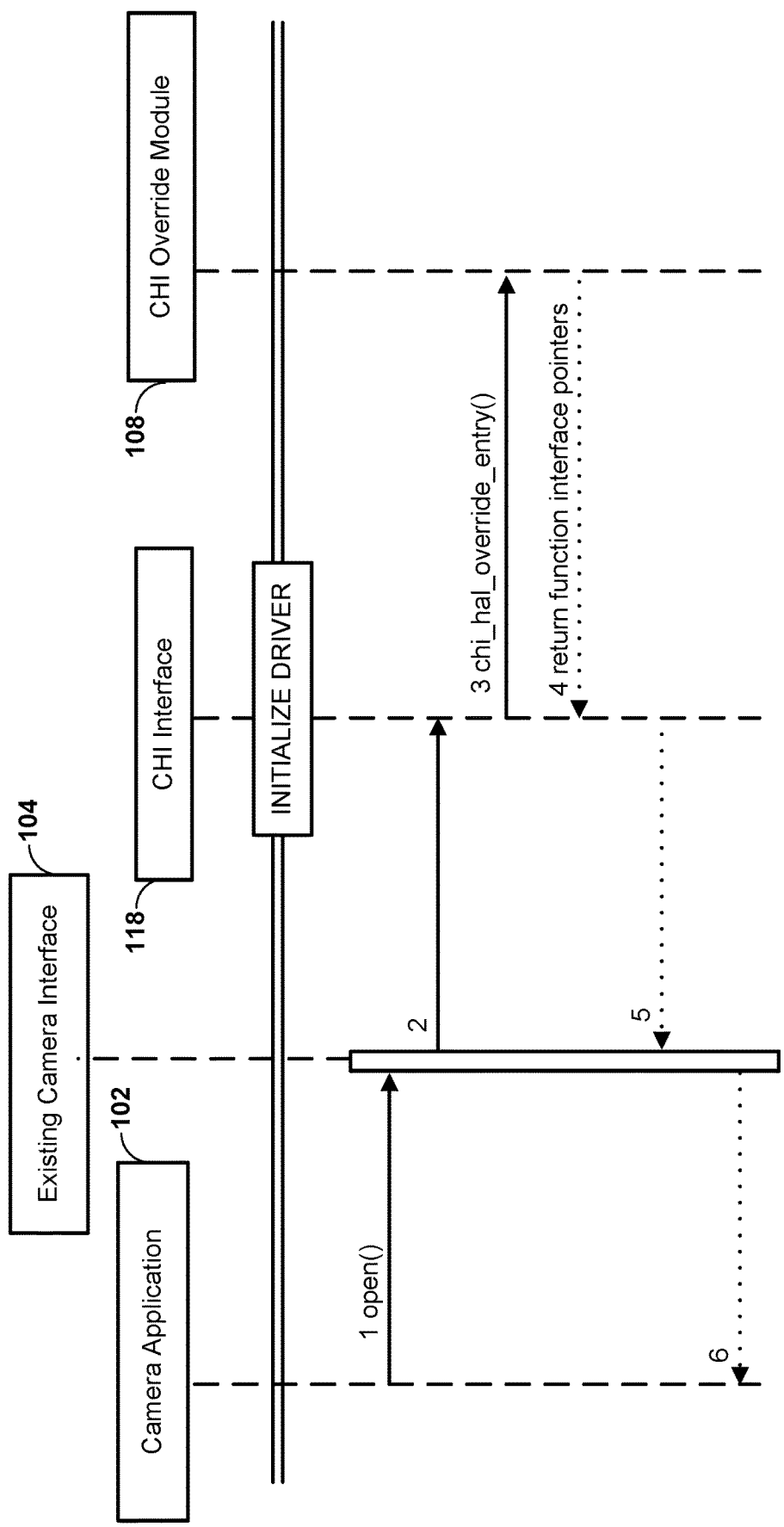
FIGS. 12A-12E illustrate an example command flow according to one example of the disclosure.
Figure 12B:
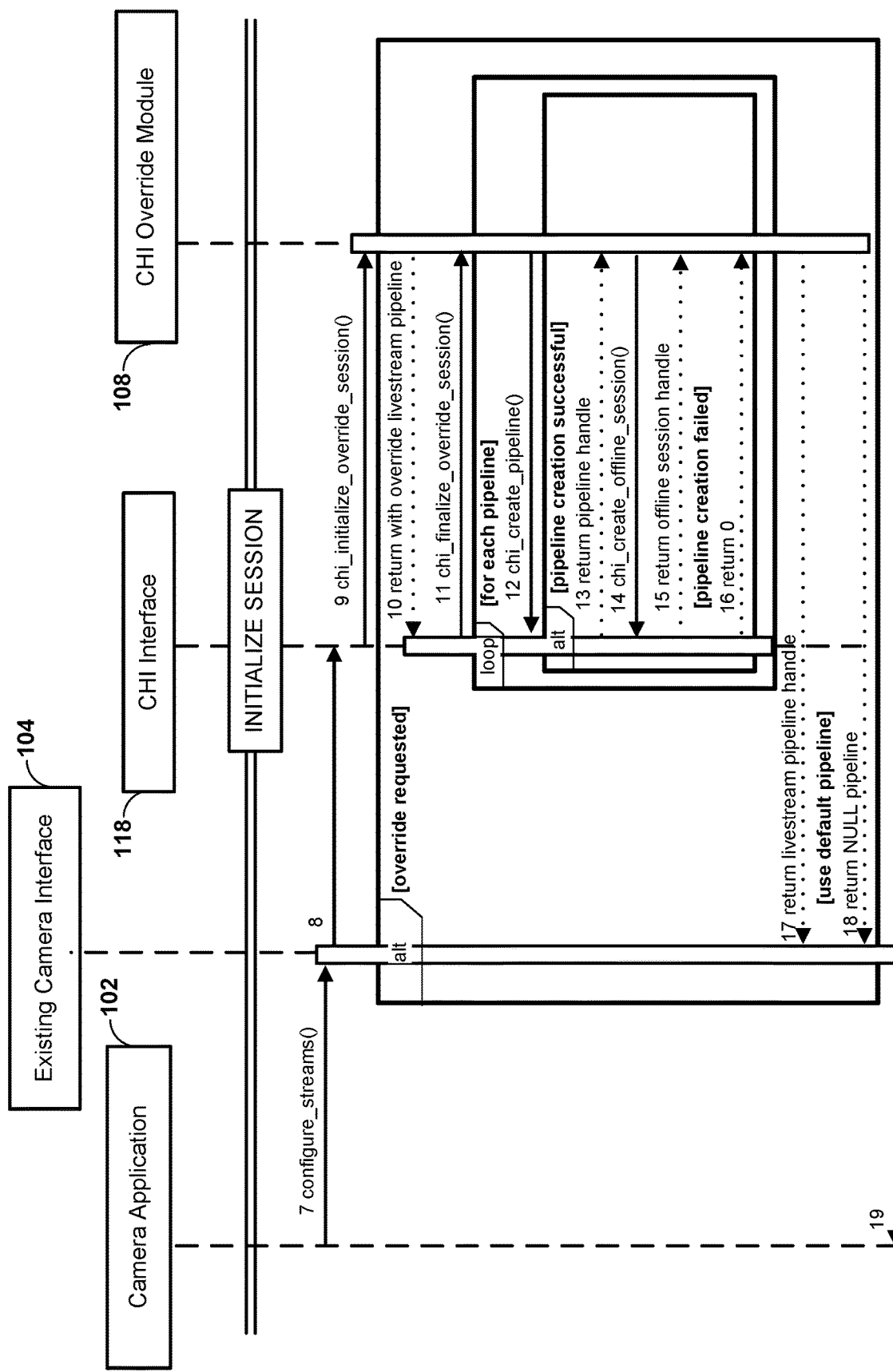

Turning to FIG. 12B, once a camera device has been created, and camera application 102 calls existing camera interface 104 to configure streams with command configure_streams (step 7), CHI interface 118 calls the chi_initialize_override_session module. If CHI override module 108 receive instructions to specify custom functionality (e.g., a custom camera pipeline) for the set of streams and other states, including per-session vendor tags, CHI override module 108 creates a camera pipeline for the livestream (e.g., camera preview), and returns that pipeline (step 10). Existing camera interface 104 validates the livestream pipeline and if valid, calls chi_finalize_override_session (step 11).

If additional postprocessing pipelines are specified, CHI override module 108 creates a pipeline for each postprocessing topology, and a session for processing each pipeline (steps 12 and 14). At this point, all process_capture_request and process_capture results are forwarded to CHI override module 108 for further processing.

Alternately, CHI override module 108 may return a NULL pipeline to indicate that no override is requested (step 18), and existing camera interface 104 should use its default behavior.

Figure 12C:
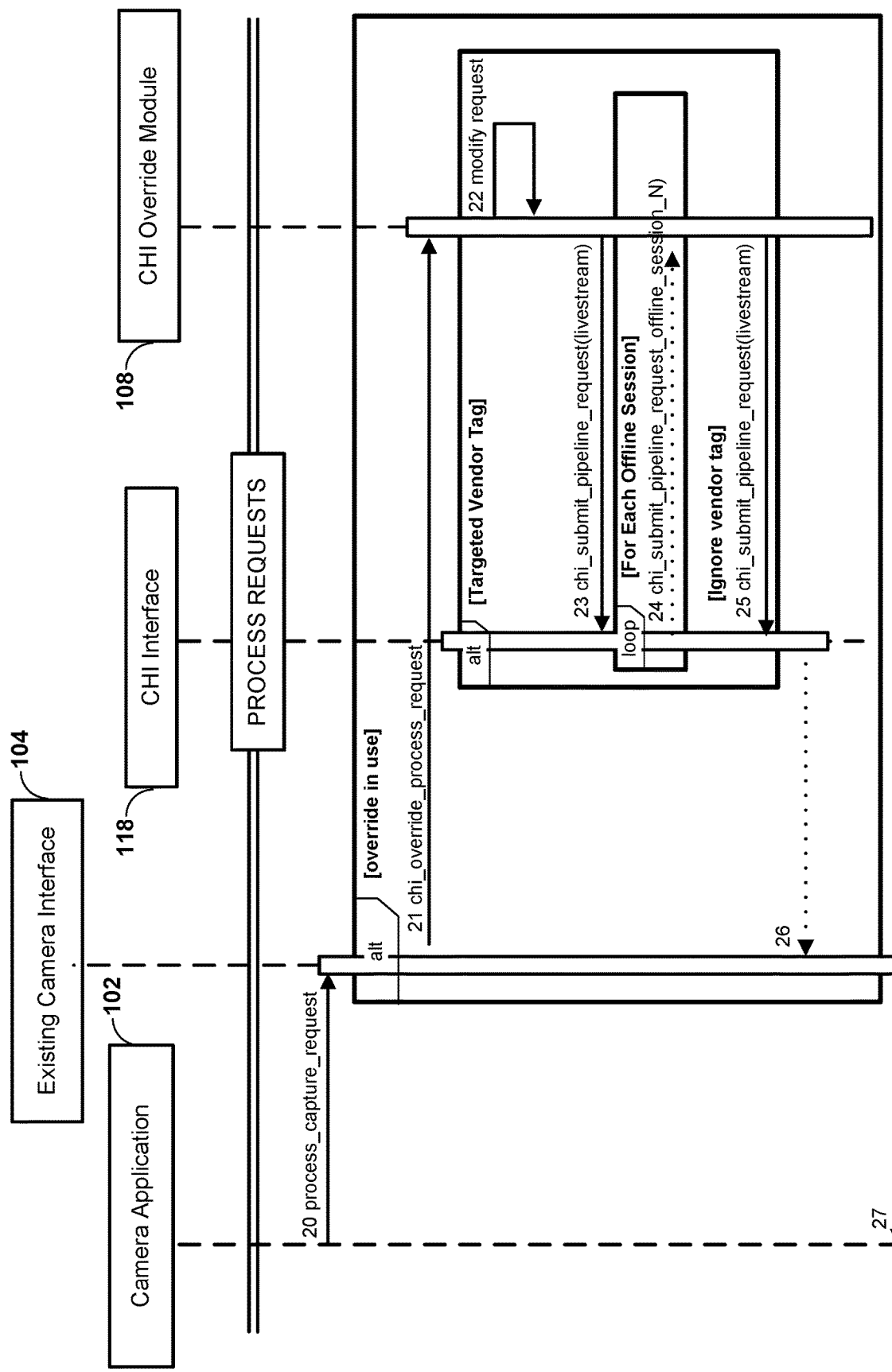

Turning to FIG. 12C, if an override is requested when existing camera interface 104 receives a process_capture_request call, existing camera interface 104 forwards the request to CHI override module 108 (step 21). At this point, CHI override module 108 may modify the request, create additional requests for multi-frame features, and forward these requests to CHI interface 118 of camera API 21 (steps 22-24). The request is submitted to the appropriate pipeline via CHI interface 118 for processing by respective drivers of camera API 21. At this point, individual nodes within the pipeline or topology are informed of the request, and appropriately scheduled for execution. If the CHI override module 108 does not have to modify the request, CHI override module 108 may forward the incoming request directly to CHI interface 118 (step 25).

If custom pipelines are not requested, existing camera interface 104 handles the request without calling CHI override module 108.

Figure 12D:
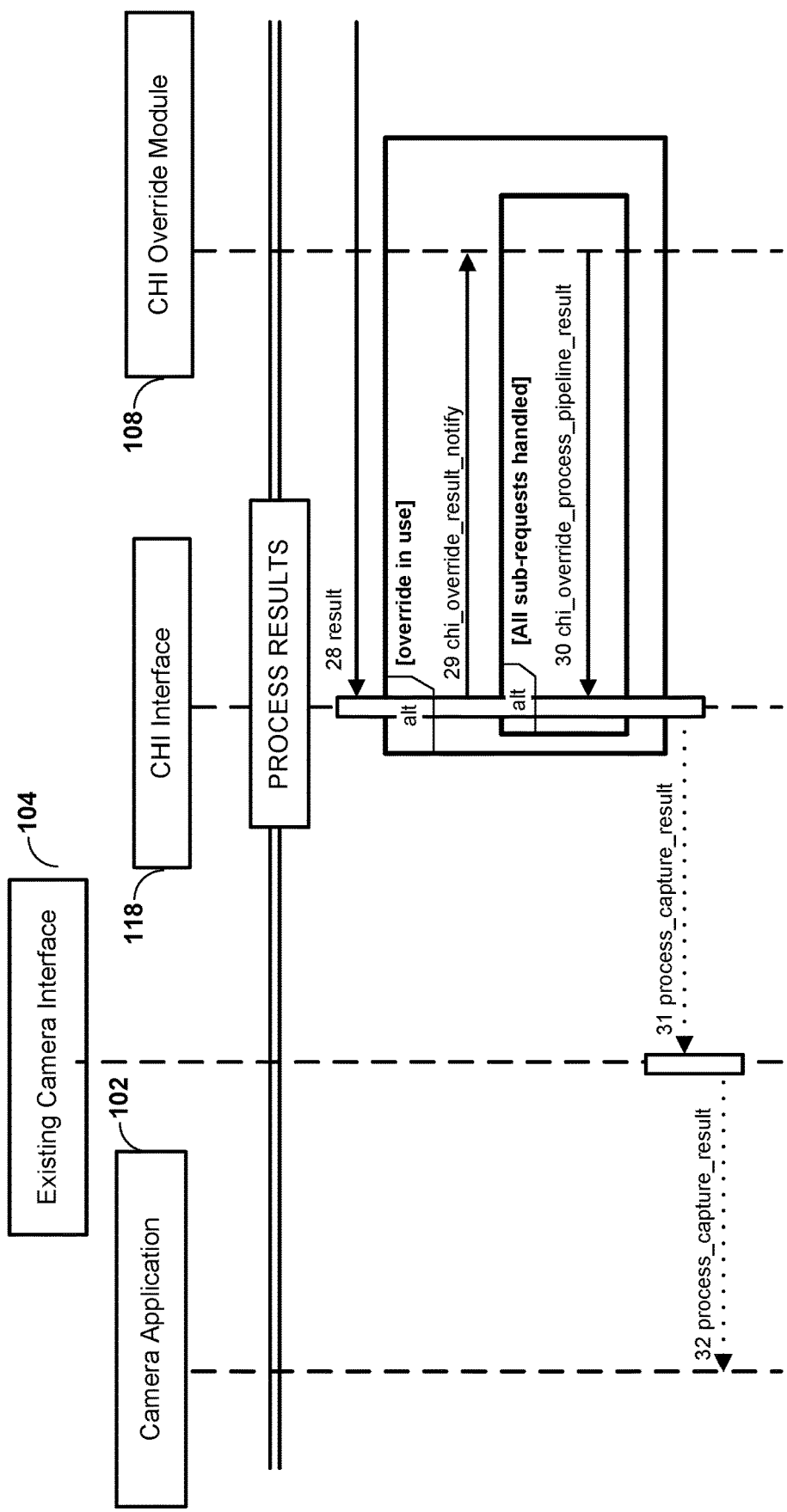

Turning to FIG. 12D, each pipeline is executed asynchronously invoking the proper nodes as the dependencies are unblocked. Results from any pipeline, including live stream and offline streams notify CHI interface 118 in the driver (step 28). CHI interface 118 forwards the result to CHI override module 108, if active, to allow CHI override module 108 to process the result (step 29). If CHI override module 108 has generated multiple requests for a single framework, CHI override module 108 waits until all of the outstanding results have been triggered before calling chi_override_prodesspipeline_result. CHI override module 108 sends one result per framework request back to CHI interface 118. CHI interface 118 in camera API 21 forwards the result to existing camera interface 104 and ultimately to camera application 102 (steps 30-32).

Figure 12E:
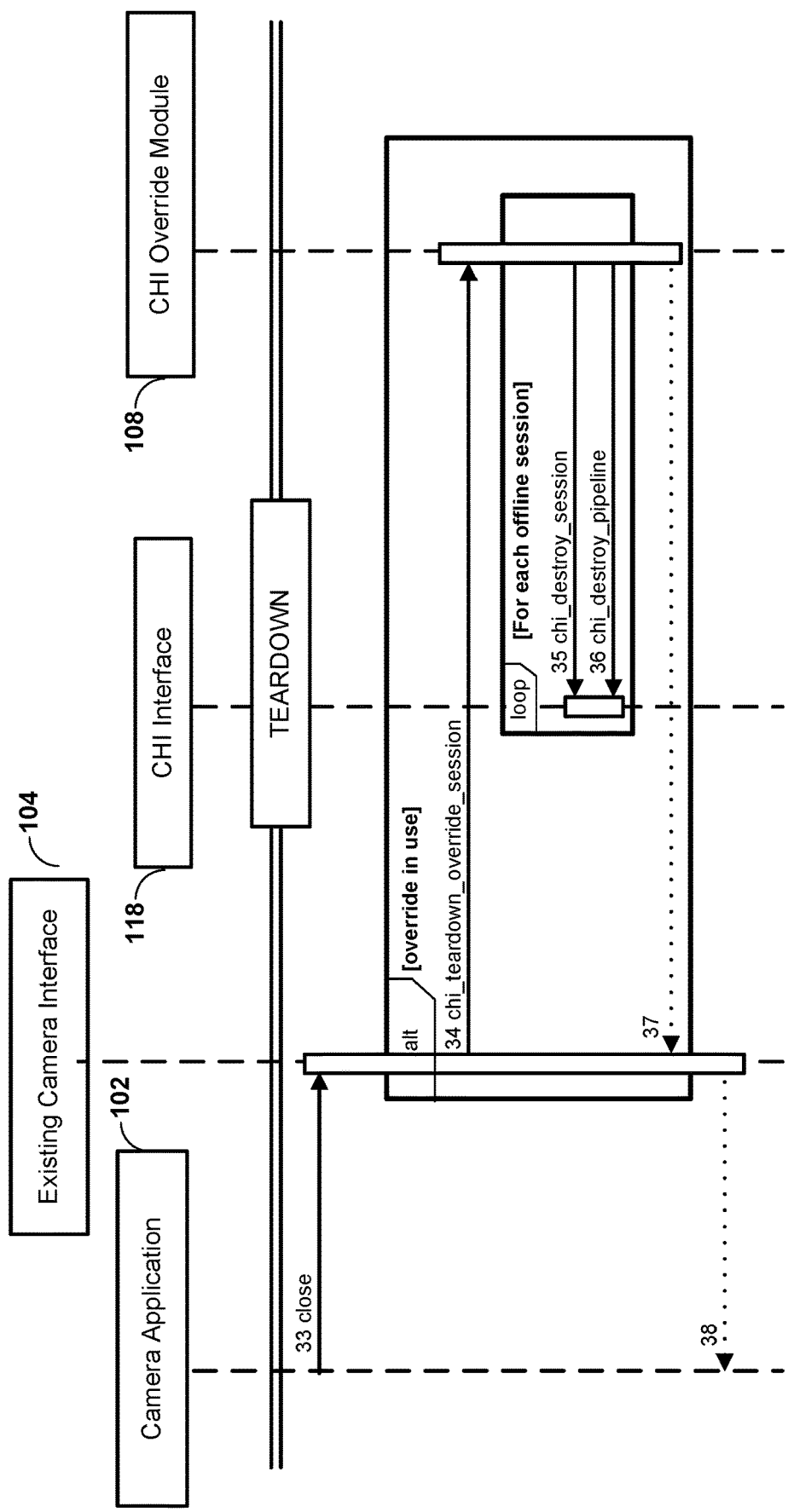

Turning to FIG. 12E, when existing camera interface 104 receives the close call from camera application 102, existing camera interface 104 calls chi_teardown_override_session. Camera API 21 then closes any custom pipelines and additional sessions (steps 34-36).

In the example of FIGS. 12A-12E, camera API 21 may perform the following techniques when processing a request. Camera API 21 may be configured to visit (e.g., send data through) all nodes for every request. However, it is possible to bypass nodes if they are not needed for a request. Links between nodes are specified by a format and size, which applies to all buffers used by that link (both as a source and sink). Links between nodes can specify as many formats as the minimum number of output ports on the parent node, and number of sink ports on the child node. The number of buffers of a given type is controlled by the topology. Camera applications can fine tune their memory usage based on how many outstanding buffers are needed to reduce the processing latency.

Figure 13:
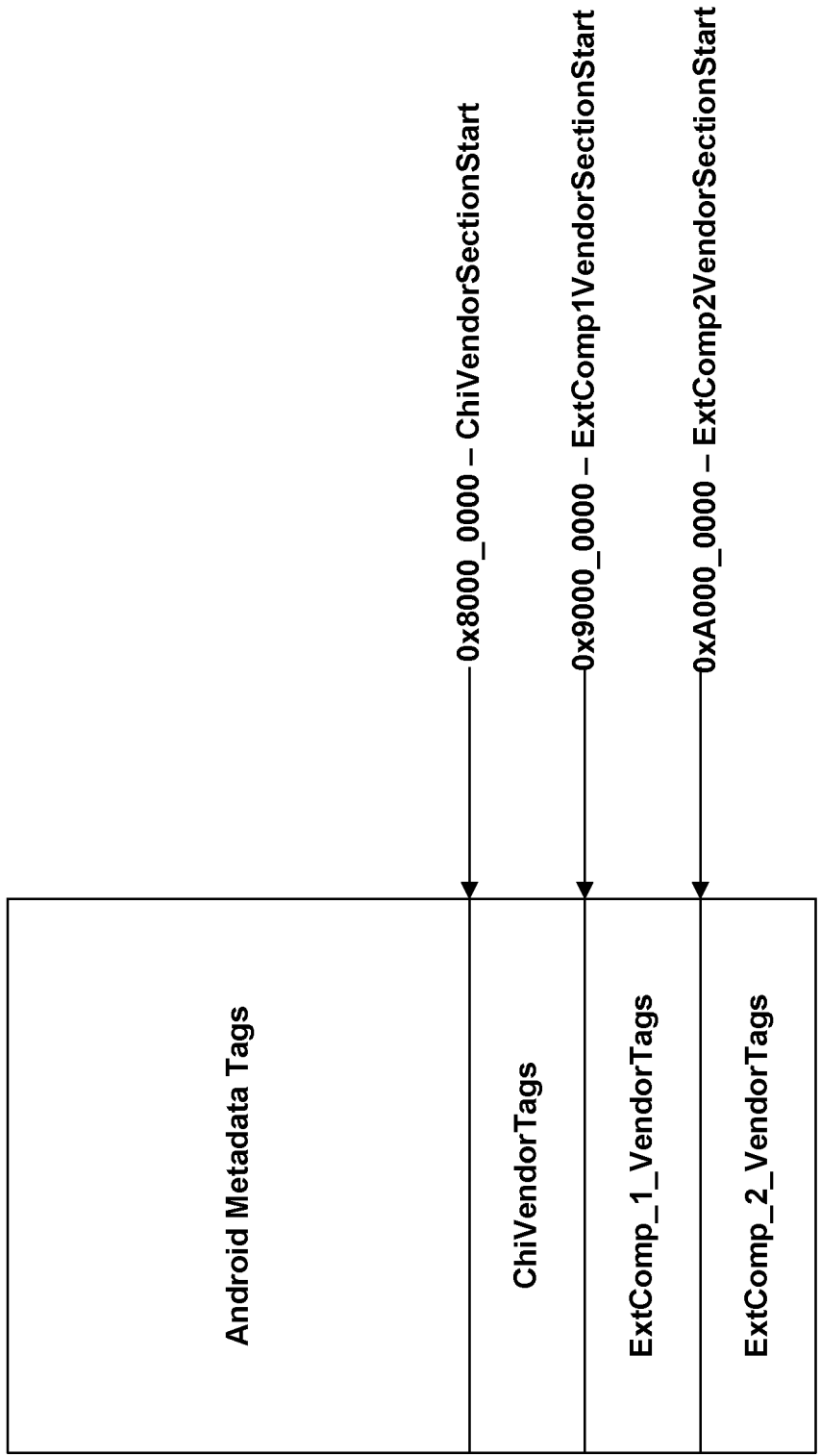
FIG. 13 is a conceptual diagram illustrating example metadata.

FIG. 13 is a conceptual diagram illustrating example metadata that may be generated and used by camera API 21. The communication channels in camera API 21 can be grouped in the following categories: data passed to the camera application 102, data passed to the specified camera pipeline, inter-node communication using the publish and subscribe mechanism, inter-node communication for processing engines internal to camera processor 14 using metadata tags, inter-node communication between camera processor 14 and a processing engine external to camera processor 14 using metadata tags, and inter-node communication between two processing engines external to camera processor 14 using metadata tags Metadata tags can be either predefined tags (e.g., Android tags for processing engines internal to camera processor 14) or custom vendor tags associated with processing engines external to camera processor 14. The metadata tags enable processing engines inside and outside of camera processor 14 to communicate with each other and with camera API 21. In camera API 21, metadata tags may be predefined with the tags taking immutable values. Because they may be custom designed, vendor tags may not be associated with fixed absolute values statically. Depending on the number and types of processing engines external to camera processor 14 on computing device 10, camera API 21 may be configured to use a dynamic indexing (e.g., base+offset) of vendor tags to enable such processing engines to communicate with each other.

In one example, the metadata tag ID is a 32-bit value, which is bounded in a specific section. Each section starts at an offset of 0x1_0000. In the example of FIG. 13, the range of tag space from 0x0000_0000 to 0x8000_0000 is reserved for the Android metadata tags. The vendor tag sections are expected to start after 0x8000_0000.

During initialization, as camera API 21 scans through the available processing engines in the computing device 10, camera API 21 assigns a vendor section start for each processing engine that publishes a custom vendor tag. Processing engines are expected to enumerate the tags as Base+Offset, with base being assigned by camera API 21.

A sample metadata tag space, including Android metadata tags, ChiVendorTags and two tags for processing engines external to camera processor 14 (e.g., ExtCompVendorTags EXT_COMP_1 and EXT_COMP_2), is depicted in FIG. 13.

Figure 14:
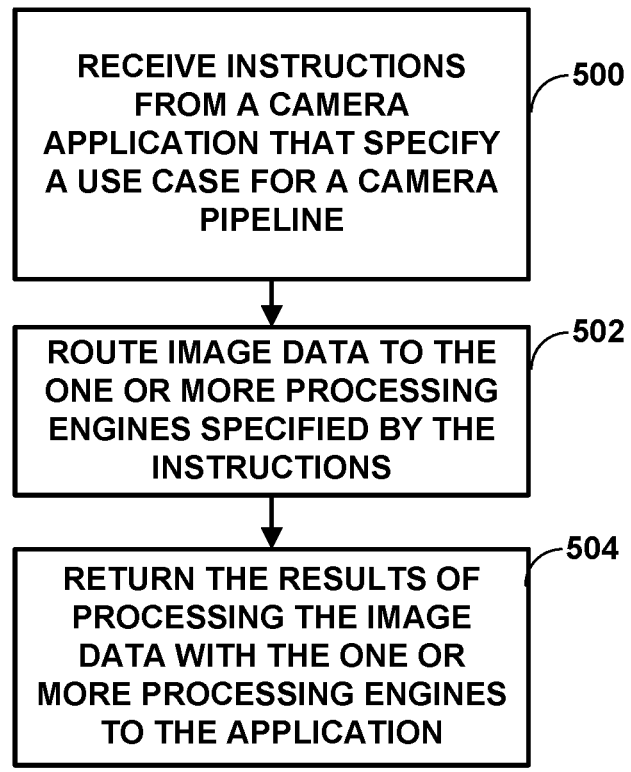
FIG. 14 is flowchart illustrating an example method according to the disclosure.

FIG. 14 is flowchart illustrating an example method according to the disclosure. The techniques of FIG. 14 may be performed by CPU 16 through the execution of camera API 21. In one example of the disclosure, a processor (e.g., CPU 16) may be configured to receive instructions from a camera application that specify a use case for a camera pipeline (500). The use case defines one or more processing engines of a plurality of processing engines for processing image data with the camera pipeline, wherein the plurality of processing engines includes one or more of fixed-function image signal processing nodes internal to camera processor 14 and one or more processing engines external to the camera processor 14 (e.g. GPU 18 or DSP 19).

CPU 16 may be further configured to route image data to the one or more processing engines specified by the instructions (502), and return the results of processing the image data with the one or more processing engines to the application (504).

In one example of the disclosure, the instructions further specify a topology of the camera pipeline, the topology defining the one or more processing engines and links between the one or more processing engines. In this example, CPU 16 may further be configured to route the image data through the camera pipeline based on the specified topology. In one example, the topology is specified by a directed acyclic graph (DAG) in an XML file.

In another example of the disclosure, the instructions further specify a sequence of buffers which are used as inputs and outputs for the one or more processing engines of the camera pipeline. In this example, CPU 16 may further be configured to cause the camera pipeline to store image data processed by the camera pipeline in the sequence of buffers specified by the instructions.

In another example of the disclosure, the instructions further specify a session for the camera pipeline, the session being a period of time for which the camera pipeline is configured. In this example, CPU 16 may further be configured to receive a request for processing the image data during the session, and process the image data using the camera pipeline specified by the instructions during the session in response to the request. In one example, CPU 16 is configured to cause the camera pipeline to access the image data from a camera sensor of camera module 12. In another example, CPU 16 is configured to cause the camera pipeline to access the image data from the memory.

In another example of the disclosure, the one or more processing engines specified by the instructions includes at least one processing engine external to camera processor 14. In this example, CPU 16 may further be configured to translate commands for the at least one processing engine external to camera processor 14 using an application programming interface (API) configured for the at least one processing engine external to camera processor 14.

In another example of the disclosure, the one or more processing engines specified by the instructions includes a custom statistics algorithm executing on a processing engine external to camera processor 14. In this example, CPU 16 may further be configured to disable a default statistics algorithm executing on camera processor 14, and route the image data to the custom statistics algorithm executing on the processing engine external to camera processor 14.

In another example of the disclosure, the instructions further specify one or more settings for camera module 12 that includes a camera sensor. In this example, CPU 16 may further be configured to cause camera module 12 to capture an image according to the one or more settings.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of ICs (e.g., a chip set). Various components, modules, or units are described in this devices or apparatuses, including a wireless handset, an integrated circuit (IC) or a set of disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for camera processing, the method comprising:
    receiving instructions from an application that specify a use case for a camera pipeline and specify a topology of the camera pipeline,
        the use case defining two or more processing engines of a plurality of processing engines for processing image data with the camera pipeline,
        the topology defining the two or more processing engines and links between the two or more processing engines,
        wherein the plurality of processing engines includes one or more of fixed-function image signal processing nodes internal to a camera processor, the fixed-function image signal processing nodes being configured to execute a statistics algorithm;
    routing, based on the topology specified by the instructions, the image data to a first processing engine of the two or more processing engines;
    processing, with the first processing engine of the two or more processing engines, the image data;
    routing, based on the topology specified by the instructions, the image data processed by the first processing engine to a second processing engine of the two or more processing engines, wherein one of the first processing engine or the second processing engine is one of two or more processing engines external to the camera processor included in the plurality of processing engines;
    processing, with the second processing engine, the image data processed by the first processing engine; and returning the results of processing the image data with the two or more processing engines to the application.

2. The method of claim 1, wherein the two or more processing engines external to the camera processor include at least one of a graphics processing unit (GPU), a central processing unit (CPU) or a digital signal processor (DSP).

3. The method of claim 1, wherein the topology is specified by a directed acyclic graph (DAG).

4. The method of claim 1, wherein the instructions further specify a sequence of buffers which are used as inputs and outputs for the two or more processing engines of the camera pipeline, the method further comprising:
cause the camera pipeline to store image data processed by the camera pipeline in the sequence of buffers specified by the instructions.

5. The method of claim 1, wherein the instructions further specify a session for the camera pipeline, the session being a period of time for which the camera pipeline is configured, the method further comprising:
receiving a request for processing the image data during the session; and
processing the image data using the camera pipeline specified by the instructions during the session in response to the request.

6. The method of claim 5, further comprising:
accessing, by the camera pipeline, the image data from a camera sensor.

7. The method of claim 5, further comprising:
accessing, by the camera pipeline, the image data from a memory.

8. The method of claim 1, further comprising:
translating commands for the two or more processing engines external to the camera processor using an application programming interface (API) configured for the processing engine external to the camera processor.

9. The method of claim 1, wherein the two or more processing engines specified by the instructions includes a custom statistics algorithm executing on a processing engine external to the camera processor, the method further comprising:
disabling a default statistics algorithm executing on the camera processor; and
routing the image data to the custom statistics algorithm executing on the processing engine external to the camera processor.

10. The method of claim 1, wherein the instructions further specify one or more settings for a camera module that includes a camera sensor, the method further comprising:
causing the camera module to capture an image according to the one or more settings.

11. An apparatus configured for camera processing, the apparatus comprising:
memory configured to store an application and a camera application programming interface (API); and
a processor in communication with the memory and configured to execute the camera API to:
receive instructions from an application that specify a use case for a camera pipeline and specify a topology of the camera pipeline, the use case defining two or more processing engines of a plurality of processing engines for processing image data with the camera pipeline, the topology defining the two or more processing engines and links between the two or more processing engines, wherein the plurality of processing engines includes one or more of fixed-function image signal processing nodes internal to a camera processor and two or more processing engines external to the camera processor, the fixed-function image signal processing nodes being configured to execute a statistics algorithm, and wherein the two or more processing engines defined by the use case include at least one of the two or more processing engines external to the camera processor;
route the image data to the two or more processing engines based on the topology specified by the instructions; and
return the results of processing the image data with the two or more processing engines to the application.

12. The apparatus of claim 11, wherein the two or more processing engines external to the camera processor include at least one of a graphics processing unit (GPU), a central processing unit (CPU), or a digital signal processor (DSP).

13. The apparatus of claim 11, wherein the topology is specified by a directed acyclic graph (DAG).

14. The apparatus of claim 11, wherein the instructions further specify a sequence of buffers which are used as inputs and outputs for the two or more processing engines of the camera pipeline, and wherein the processor is further configured to:
cause the camera pipeline to store image data processed by the camera pipeline in the sequence of buffers specified by the instructions.

15. The apparatus of claim 11, wherein the instructions further specify a session for the camera pipeline, the session being a period of time for which the camera pipeline is configured, and wherein the processor is further configured to:
receive a request for processing the image data during the session; and
process the image data using the camera pipeline specified by the instructions during the session in response to the request.

16. The apparatus of claim 15, wherein the processor is further configured to:
cause the camera pipeline to access the image data from a camera sensor.

17. The apparatus of claim 15, wherein the processor is further configured to:
cause the camera pipeline to access the image data from the memory.

18. The apparatus of claim 11, wherein the processor is further configured to:
translate commands for the at least one of the two or more processing engines external to the camera processor using an application programming interface (API) configured for the two or more processing engines external to the camera processor.

19. The apparatus of claim 11, wherein the two or more processing engines specified by the instructions includes a custom statistics algorithm executing on a processing engine external to the camera processor, and wherein the processor is further configured to:
disable a default statistics algorithm executing on the camera processor; and
route the image data to the custom statistics algorithm executing on the processing engine external to the camera processor.

20. The apparatus of claim 11, wherein the instructions further specify one or more settings for a camera module that includes a camera sensor, and wherein the processor is further configured to:
cause the camera module to capture an image according to the one or more settings.

21. The apparatus of claim 11, wherein the apparatus further comprises:
the camera processor;
the two or more processing engines external to the camera processor; and
a camera module configured to capture the image data.

22. A computer-readable storage medium storing instructions that, when executed, cause one or more processors to:
receive instructions from an application that specify a use case for a camera pipeline and specify a topology of the camera pipeline, the use case defining two or more processing engines of a plurality of processing engines for processing image data with the camera pipeline, the topology defining the two or more processing engines and links between the two or more processing engines, wherein the plurality of processing engines includes one or more of fixed-function image signal processing nodes internal to a camera processor and two or more processing engines external to the camera processor, the fixed-function image signal processing nodes being configured to execute a statistics algorithm, and wherein the two or more processing engines defined by the use case include at least one of the two or more processing engines external to the camera processor;
route the image data to the two or more processing engines based on the topology specified by the instructions; and
return the results of processing the image data with the two or more processing engines to the application.

23. The computer-readable storage medium of claim 22, wherein the instructions further specify a sequence of buffers which are used as inputs and outputs for the two or more processing engines of the camera pipeline, and wherein the instructions further cause the one or more processors to:
cause the camera pipeline to store image data processed by the camera pipeline in the sequence of buffers specified by the instructions.

24. The computer-readable storage medium of claim 22, wherein the instructions further specify a session for the camera pipeline, the session being a period of time for which the camera pipeline is configured, and wherein the instructions further cause the one or more processors to:
receive a request for processing the image data during the session; and
process the image data using the camera pipeline specified by the instructions during the session in response to the request.

25. The computer-readable storage medium of claim 22, wherein the instructions further cause the one or more processors to:
translate commands for the at least one of the two or more processing engines external to the camera processor using an application programming interface (API) configured for the two or more processing engines external to the camera processor.

26. The computer-readable storage medium of claim 22, wherein the two or more processing engines specified by the instructions includes a custom statistics algorithm executing on a processing engine external to the camera processor, and wherein the instructions further cause the one or more processors to:
disable a default statistics algorithm executing on the camera processor; and
route the image data to the custom statistics algorithm executing on the processing engine external to the camera processor.

27. An apparatus configured for camera processing, the apparatus comprising:
means for receiving instructions from an application that specify a use case for a camera pipeline and specify a topology of the camera pipeline, the use case defining two or more processing engines of a plurality of processing engines for processing image data with the camera pipeline, the topology defining the two or more processing engines and links between the two or more processing engines, wherein the plurality of processing engines includes one or more of fixed-function image signal processing nodes internal to a camera processor and two or more processing engines external to the camera processor, the fixed-function image signal processing nodes being configured to execute a statistics algorithm, and wherein the two or more processing engines defined by the use case include at least one of the two or more processing engines external to the camera processor;
means for routing the image data to the two or more processing engines based on the topology specified by the instructions; and
means for returning the results of processing the image data with the two or more processing engines to the application.

28. The method of claim 1, further comprising:
receiving second instructions from a second application that specify a second use case for the camera pipeline and specify a second topology of the camera pipeline,
the second use case defining a second two or more processing engines of the plurality of processing engines for processing second image data with the camera pipeline,
the second topology defining the second two or more processing engines and links between the second two or more processing engines;
routing, based on the second topology specified by the second instructions, the second image data to a third processing engine of the second two or more processing engines;
processing, with the third processing engine of the second two or more processing engines, the second image data;
routing, based on the second topology specified by the instructions, the second image data processed by the third processing engine to a fourth processing engine of the second two or more processing engines;
processing, with the fourth processing engine, the second image data processed by the third processing engine; and
returning the results of processing the second image data with the second two or more processing engines to the application.

29. The device apparatus of claim 11, wherein:
the memory is further configured to store a second application; and
the processor is further configured to execute the camera API to:
receive second instructions from the second application that specify a second use case for the camera pipeline and specify a second topology of the camera pipeline, the second use case defining a second two or more processing engines of the plurality of processing engines for processing second image data with the camera pipeline, the second topology defining the second two or more processing engines and links between the second two or more processing engines;

route the second image data to the second two or more processing engines based on the second topology specified by the second instructions; and return the results of processing the second image data with the second two or more processing engines to the application.

30. The computer-readable storage medium of claim 22, wherein the instructions further cause the one or more processors to:

receive second instructions from a second application that specify a second use case for the camera pipeline and specify a second topology of the camera pipeline, the second use case defining a second two or more processing engines of the plurality of processing engines for processing second image data with the camera pipeline, the second topology defining the second two or more processing engines and links between the second two or more processing engines;

route the second image data to the second two or more processing engines based on the second topology specified by the second instructions; and return the results of processing the second image data with the second two or more processing engines to the application.

* * * * *